United States Patent
Ayanoğlu et al.

(10) Patent No.: US 12,452,320 B2
(45) Date of Patent: Oct. 21, 2025

(54) PERSISTENT PARTICIPANT PRIORITIZATION ACROSS COMMUNICATION SESSIONS

(71) Applicant: MICROSOFT TECHNOLOGY LICENSING, LLC, Redmond, WA (US)

(72) Inventors: Defne Ayanoğlu, Prague (CZ); Nakul Madaan, Munich (DE); Chris Sano, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 17/978,121

(22) Filed: Oct. 31, 2022

(65) Prior Publication Data

US 2024/0146779 A1 May 2, 2024

(51) Int. Cl.
*H04L 65/1093* (2022.01)
*G06F 3/14* (2006.01)
*H04N 5/262* (2006.01)

(52) U.S. Cl.
CPC ........ *H04L 65/1093* (2013.01); *G06F 3/1454* (2013.01); *H04N 5/2624* (2013.01)

(58) Field of Classification Search
CPC .. H04N 5/2624; G06F 3/1454; H04L 65/1093
See application file for complete search history.

(56) References Cited

U.S. PATENT DOCUMENTS 9,032,028 B2 * 5/2015 Davidson ............ G06F 3/04842
  709/204
9,438,655 B2 9/2016 Chougle et al.
(Continued)

FOREIGN PATENT DOCUMENTS

EP 2614637 B1 9/2018
EP 3443742 A1 2/2019
(Continued)

OTHER PUBLICATIONS

International Search Report and Written Opinion received for PCT Application No. PCT/US2023/032821, Dec. 15, 2023, 14 pages.
"Collaboration That Works for Everyone", Retrieved from: https://www.webex.com/accessibility.html, May 16, 2021, 10 Pages.
"Pinning Participants' Videos", Retrieved from: https://support.zoom.us/hc/en-us/articles/201362743-Pinning-participants-videos, Sep. 20, 2020, 3 Pages.
(Continued)

*Primary Examiner* — Duc Nguyen
*Assistant Examiner* — Carissa A Jones
(74) *Attorney, Agent, or Firm* — Scott Y. Shigeta; Newport IP, LLC

(57) ABSTRACT

A system for persistent participant prioritization across communication sessions is provided. A user can establish a priority for an assistant having a particular role, e.g., a sign language interpreter, a translator, etc. That prioritization can be stored in a user setting that causes a system to automatically persist the display of a video stream of their assistant in a designated region of a user interface throughout a communication session. The user setting is also utilized by the system so that the prioritization of the assistant persists across multiple communication sessions. The display of a video of an assistant is automatically positioned in the designated region each time the user joins a meeting without requiring an input to "pin" the display of another participant. The persistent display of the video stream is not interrupted by predetermined events of a communication session, e.g., a presenter sharing content, detection of low network bandwidth.

20 Claims, 14 Drawing Sheets

(56) References Cited

U.S. PATENT DOCUMENTS

| | | | |
|---|---|---|---|
| 9,462,227 B2 | 10/2016 | Duckworth et al. | |
| 10,126,927 B1* | 11/2018 | Fieldman | G06F 3/1454 |
| 10,509,964 B2 | 12/2019 | Astavans et al. | |
| 11,330,021 B1 | 5/2022 | Slotznick | |
| 2012/0182381 A1* | 7/2012 | Abate | H04L 12/1822 |
| | | | 348/E7.083 |
| 2018/0046423 A1* | 2/2018 | Abraham | G09G 5/30 |
| 2018/0278891 A1 | 9/2018 | Pan | |
| 2019/0068678 A1* | 2/2019 | Singh | H04N 19/179 |
| 2020/0371677 A1 | 11/2020 | Faulkner | |
| 2022/0150083 A1 | 5/2022 | Faulkner | |
| 2023/0083688 A1* | 3/2023 | Janakiraman | G06F 3/0482 |
| | | | 348/14.03 |
| 2024/0338165 A1* | 10/2024 | He | H04N 21/4728 |

FOREIGN PATENT DOCUMENTS

| | | | | |
|---|---|---|---|---|
| IN | 201006767 | | 7/2011 | |
| WO | WO-2006023961 A2 * | 3/2006 | | H04L 12/1822 |
| WO | WO-2022245787 A1 * | 11/2022 | | G06F 3/04845 |

OTHER PUBLICATIONS

Tamarov, Maxim, "Zoom Addresses Accessibility for Deaf and Hard of Hearing", Retrieved from: https://www.techtarget.com/searchunifiedcommunications/news/252489685/Zoom-addresses-accessibility-for-deaf-and-hard-of-hearing, Sep. 25, 2020, 3 Pages.
International Preliminary Report on Patentability received for PCT Application No. PCT/US2023/032821, May 15, 2025, 9 pages.

* cited by examiner

PERSISTENT PARTICIPANT PRIORITIZATION ACROSS COMMUNICATION SESSIONS

BACKGROUND

There are a number of collaborative systems that allow users to communicate. For example, some systems allow people to collaborate by sharing content using video streams, shared files, chat messages, etc. Some systems also allow people to simultaneously edit documents while also enabling them to communicate using video and audio streams. Users can also establish a communication session at a specific time, e.g., a time slot for an online meeting, and share live video streams that can concurrently display people and content.

Although existing collaborative systems provide feature sets that allow people to conduct meetings via live video streams, some of these systems still have a number of drawbacks. For example, some existing systems do not have effective features that accommodate people who need language translators or sign language interpreters. In such instances, a meeting attendee can have an assistant, e.g., a translator or an interpreter, join a meeting. The assistant can then listen to the meeting, observe shared content and video streams, and provide an interpretation of their observations. For these tasks, it is important for the meeting attendee to have a clear view of their assistant. It can be difficult for the attendee to keep up with the flow of the meeting if the video rendering of the assistant moves or resizes during the meeting. Salient information may be missed if this occurs.

Some existing systems offer limited features to limit the movement of video streams. For example, some current solutions allow a meeting attendee to select a video stream, e.g., a video stream can be "pinned" into a location. A video that is "pinned" is a video that is selected to be fixed to a particular location of a user interface during one or more select operations. Although this solution can help in some situations, there are many instances where these selected streams can be resized, moved, or removed altogether. In some illustrative examples, a selected stream can be moved or resized when they are overridden or predominated by other prioritization features such as "Spotlighting" or when other events occur, such as a low bandwidth detection, etc. Spotlighting occurs when a meeting participant wants to highlight a person in a meeting for others to see. If a meeting moderator spotlights a particular person, a video of an assistant for some participants may be interrupted. This interruption of a video stream of a meeting assistant can cause a loss of production and engagement for the person that relies on their assistant, particularly in a situation where sign language interpretation or language translation is needed.

In addition, when a person is pinned by a meeting attendee, that selection only applies to the video stream for that particular meeting. Thus, each time a person joins a meeting, they have to locate a video stream of an assistant, and manually select that video stream. This is a cumbersome task that can cause a person to miss a portion of a meeting or cause an interruption for other participants. Moreover, the requirement of this manual operation to select a stream for an assistant sometimes requires their assistant to be online for them to be selected. This may require a person to wait for his or her assistant to join. This coordination requires a particular sequence in which people join a meeting, which can interrupt other events and the overall flow of a meeting. These issues can be further exacerbated by the fact that a person might need multiple assistants. All of these issues can lead to a loss of production and engagement, which ultimately leads to inefficient use of computing resources.

SUMMARY

The techniques disclosed herein enable a system to provide persistent participant prioritization across communication sessions. A user can establish a priority for an assistant having a particular role, e.g., a sign language interpreter, a translator, etc. That prioritization can be stored in a user setting that causes a system to automatically persist the display of a video stream of their assistant in a designated region of a user interface throughout a communication session. The user setting is also utilized by the system so that the prioritization of the assistant persists across multiple communication sessions. Thus, the display of a video stream of an assistant is automatically positioned in the designated region each time the user joins a meeting without requiring a user input to "pin" the display of another participant. The persistent display of the video stream is not interrupted by predetermined events of a communication session, e.g., a presenter sharing content, detection of low network bandwidth, detection of active speakers, participants joining a session, etc.

In some configurations, the system can provide multiple levels of prioritization so that some users can be applied to a "regular pin" while others can be applied to a "super pin." User settings can define individual priority levels assigned to individual groups of participants. A first priority level, e.g., a super pin, causes a system to display renderings of a first set of participants, such as a sign language interpreter, within a first designated region, e.g., a primary stage of a user interface. The user settings can cause the system to restrict movement of the renderings of the first set of participants in the event of a first category of state changes of the communication session, e.g., detection of an active speaker, detection of a user joining a meeting, detection of a user leaving a meeting, etc. The user settings can also cause the system to restrict movement of the renderings of the first set of participants in the event of a second category of state changes of the communication session, detection of low bandwidth, display of shared content, etc.

A second priority level, e.g., a regular pin, causes the system to display renderings of a second set of participants, such as select team members, within a second designated region, e.g., a secondary stage, of a user interface. The user settings can restrict the movement of the second set of participants in response to the first category of state changes, e.g., detection of active speakers, while allowing movement of the second set of participants in response to a second category of state changes of the communication session, e.g., detection of low bandwidth, display of shared content, etc.

The techniques disclosed herein provide a number of technical benefits. In one example, the techniques disclosed herein provide reliable accessibility features. If a participant of a meeting is in need of a sign language interpreter, the system can maintain the display of their sign language interpreter throughout a number of interruptions. This has a number of benefits over traditional pinning. For example, certain events, e.g., detection of low bandwidth, do not disrupt the display of the video stream of the language interpreter. This allows the user to view an interpretation of the content of a meeting with an increased reliability over some existing systems. In addition, the user does not have to go through the process of selecting the language interpreter to be pinned during a meeting. The automatic selection and persistent display of an assistant eliminates the need for a meeting participant to manually identify another user as an assistant and provide input to pin a display of that other user. This can save a number of computing resources in that a meeting participant does not interrupt a meeting or miss any content each time they join a meeting.

By providing participant prioritization across communication sessions, systems can promote user engagement. By promoting user engagement and avoiding user fatigue, particularly in a communication system, users can more effectively exchange information. This helps mitigate occurrences where shared content is missed or overlooked when users become distracted or disengaged. Promotion of user engagement and avoidance of user fatigue can reduce occurrences where users need to prolong meetings or re-send missed information. More effective communication of shared content can also help avoid the need for external systems, such as mobile phones for texting and other messaging platforms. This can help reduce the duplicative use of network, processor, memory, or other computing resources. The disclosed techniques also provide improved human interaction with a system using automation of user settings. This enables a system to be utilized in more effective ways by reducing the display of unwanted menus, reducing erroneously selected objects, or reducing erroneously triggered operations.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

FIGS. 1A through 1H illustrate aspects of a system 100 that is used for providing participant prioritization across communication sessions. The system utilizes settings that persist across multiple communication sessions for a person participating in several meetings. The settings define individual prerequisites for the participant. For example, the settings can define a prerequisite indicating that the participant is in need of a sign language translator or that the participant is in need of hearing assistance. The settings can be accessed by the system each time a communication session, e.g., a meeting, starts so that the system can identify an assistant for the participant prior to the start of each meeting. This avoids the need for the participant to search for, and select, an assistant who can help with the participant's prerequisites. This avoids the need for the participant to coordinate with other users and mitigates the need for the participant to perform a number of manual inputs, which can be distracting to all attendees and inefficient with respect to computing resources.

In some embodiments, the system can identify a particular person as an assistant by identifying a role that corresponds with the participant's prerequisites. For example, if the participant's prerequisites indicate that the participant is hard-of-hearing, and another person has role as a "sign language translator" the system may identify that other person as the participant's assistant. In response to the selection of the assistant, the system then automatically displays a live video stream of the assistant on a user interface rendered on the participant's computer.

Figure 1A:
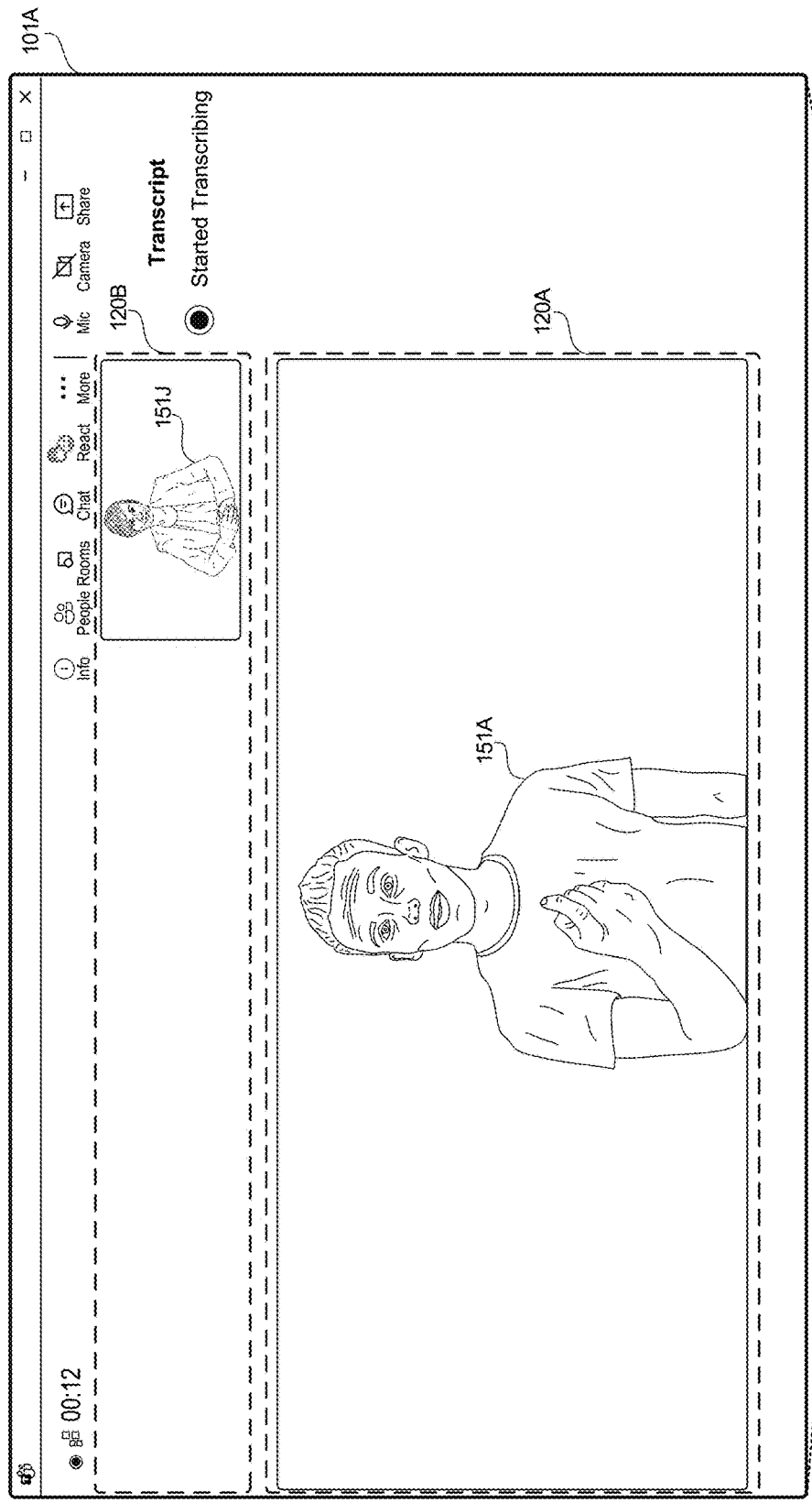
FIG. 1A shows a persistent display of a video of an assistant that is automatically configured in a designated region of a user interface in response to determining that a role of the assistant corresponds to a prerequisite of a user associated with the user interface.
Figure 1A:
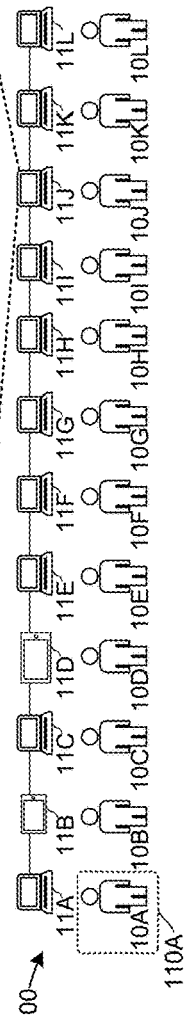

A communication session can be in the form of an on-line meeting, a broadcast or any other gathering that includes a start time and an end time. As shown in FIG. 1A, the communication session can be managed by a system 100 comprising a number of computers 11 each corresponding to individual users 10. For illustrative purposes, a first user 10A, Mike Taylor, is associated with a first computer 11A, a second user 10B, Traci Isaac, is associated with a second computer 11B, a third user 10C, Doug Wright, is associated with a third computer 11C, a fourth user 10D, MJ Price, is associated with a fourth computer 11D, a fifth user 10E, Kat Martin, is associated with a fifth computer 11E, a sixth user 10F, Miguel Jones, is associated with a sixth computer 11F, a seventh user 10G, Krystal McKinney, is associated with a seventh computer 11G, an eighth user 10H, Jessica Kline, is associated with an eighth computer 11H, a ninth user 10I, Monica Larsson, is associated with a nineth computer 11I, a Tenth User 10J, Charlotte Davis, is associated with a tenth computer 11J, an eleventh user 10K, Annika Andersson, is associated with an eleventh computer 11K, and a twelfth user 10L, Isla Scoggins, is associated with a twelfth computer 11L. These users can also be respectively referred to as "User A," User B," etc.

Each user can be displayed in a user interface as two-dimensional 2D images or each user can be displayed in a user interface as a three-dimensional representation, e.g., an avatar. The 3D representation may be a static model or a dynamic model that is animated in real-time responsive to a user input. Although this example illustrates a user interface with users displayed as 2D images, it can be appreciated that the techniques disclosed herein can apply to other forms of representations, videos or other types of renderings. The computers 11 can be in the form of desktop computers, head-mounted display units, tablets, mobile phones, etc. The system can generate a user interface showing aspects of the communication session to each of the users. In the example of FIG. 1A, a first user interface arrangement 101A can include a number of renderings of one or more users 10. The renderings can include renderings of two-dimensional (2D) images, which can include a picture or live video feed of a user.

In this example, the user interface is rendered on a display device of the tenth computer 11J, which is associated with the Tenth User 10J, Charlotte Davis. Charlotte is referred to herein as the "viewer" of the user interface displayed on the tenth computer 11J. The first user interface arrangement 101A comprises a first region 120A, also referred to herein as a designated region 120A or a primary stage 120A. The first user interface arrangement 101A also includes a second region 120B, also referred to herein as a secondary region 120B or a secondary stage 120B. The first user interface arrangement 101A also comprises another rendering of a video stream 151J showing a self-view of the Tenth User 10J. This video stream 151J can be displayed in the second region 120B and is restricted from being displayed in the first region 120A. The first region is only reserved for video streams of users having roles that correspond to prerequisites of the viewer. The viewer in this example is the Tenth User 10J of the tenth computer 11J.

When the Tenth User 10J (User J) joins the communication session, the system automatically accesses the preferences of User J. The preferences can indicate that User J is in need of assistance, e.g., a prerequisite that User J has indicated they are hard-of-hearing and is in need of assistance. In response to that indication, the system can cause a display of a rendering of a video stream 151A of a select user, e.g., the First User 10A (User A), within the designated region 120A of the user interface 101A. As described in more detail below with respect to FIG. 2, User A can be selected for display in the primary stage 120A in response to determining that User A has a role, e.g., a sign language interpreter, that corresponds to the prerequisite of User J, e.g., an indication that User J is hard-of-hearing.

Figure 1B:
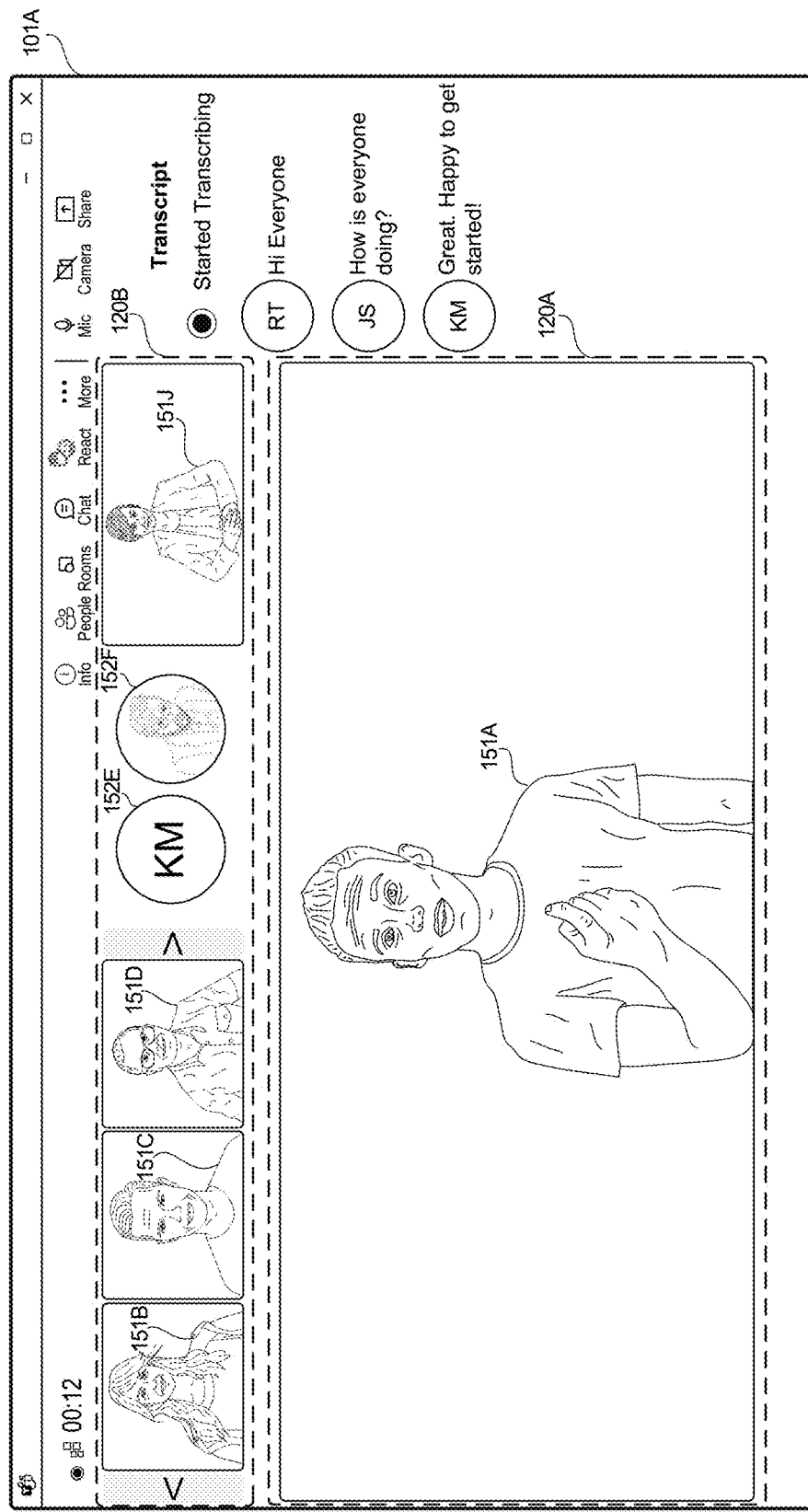
FIG. 1B shows a video of an assistant that is persistently displayed through a process where other participants are joining the communication session.
Figure 1B:
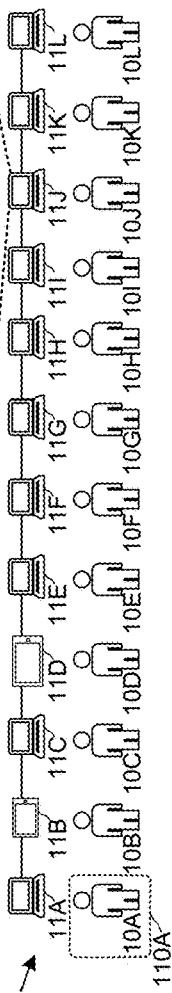

FIGS. 1B through 1H show examples of how the assistant can be persistently displayed in a designated region even when the communication session transitions through different types of state changes. For example, FIG. 1B shows how the video of the assistant is persistently displayed through a process where other participants are joining the communication session. In this example, as other participants join the communication session, renderings of each user can be rearranged in the secondary region 120B. As each participant joins, one section, e.g., the left side, of the secondary region 120B may be populated with renderings of participants having live video streams. This can include a rendering 151B of the second user 10B, a rendering 151C of the third user 10C, and a rendering 151D of the fourth user 10D. Another section, e.g., the middle, of the secondary region 120B may be populated with still images for users who are working with computers that are not generating a live video stream. These users are referred to herein as audio-only users. For example, the fifth user 10E is displayed as a representation 152E in the form of text, and the sixth user 10F is displayed as a representation 152F in the form of a still image. As these other users join the meeting, the first user 10A is persistently displayed in a primary stage 120A and the rendering of the first user 10A is not moved even though other users may be rearranged as each individual joins the meeting.

Figure 1C:
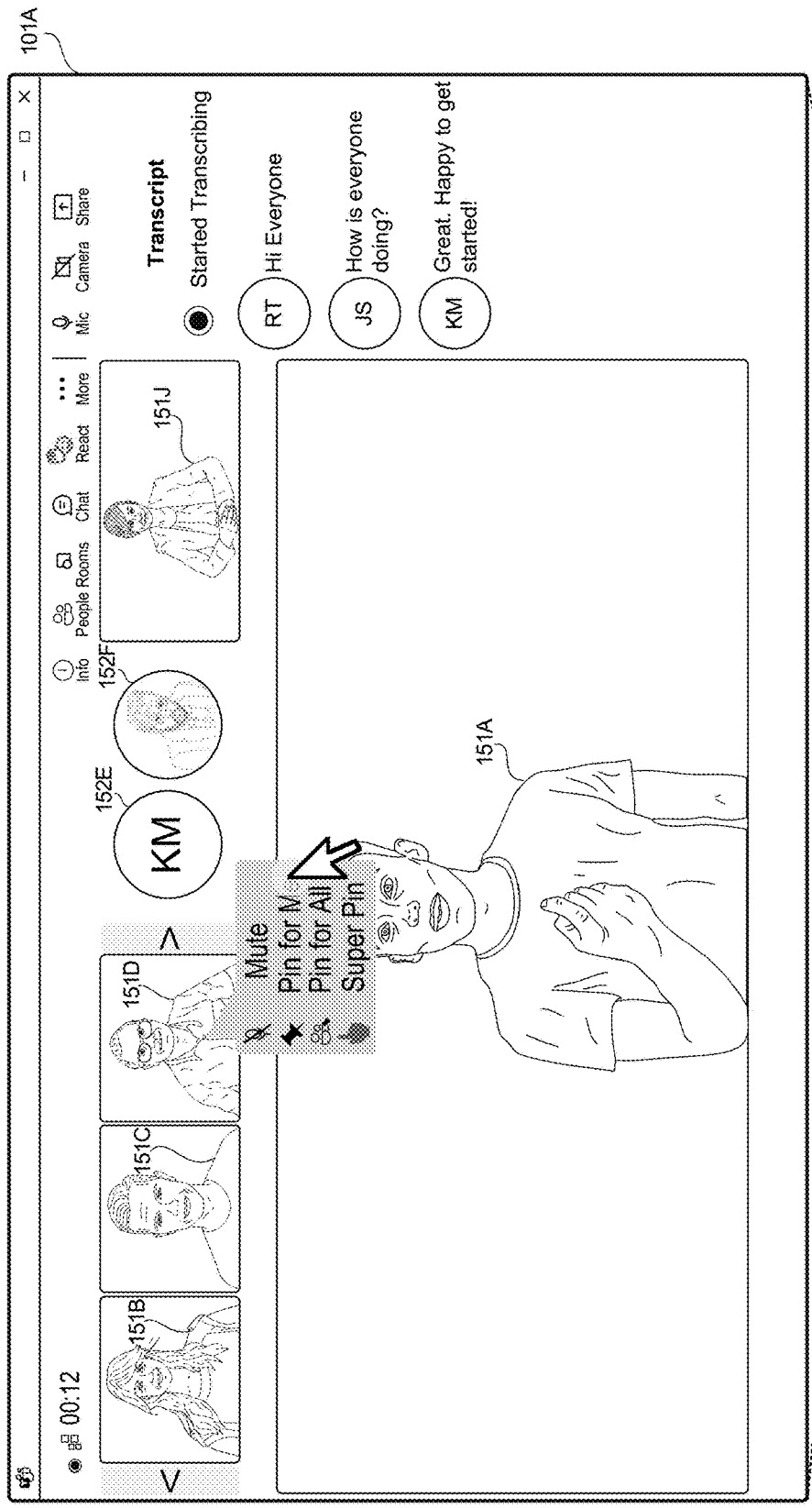
FIG. 1C shows how a user of a communication session can be pinned in a position in a user interface.
Figure 1D:
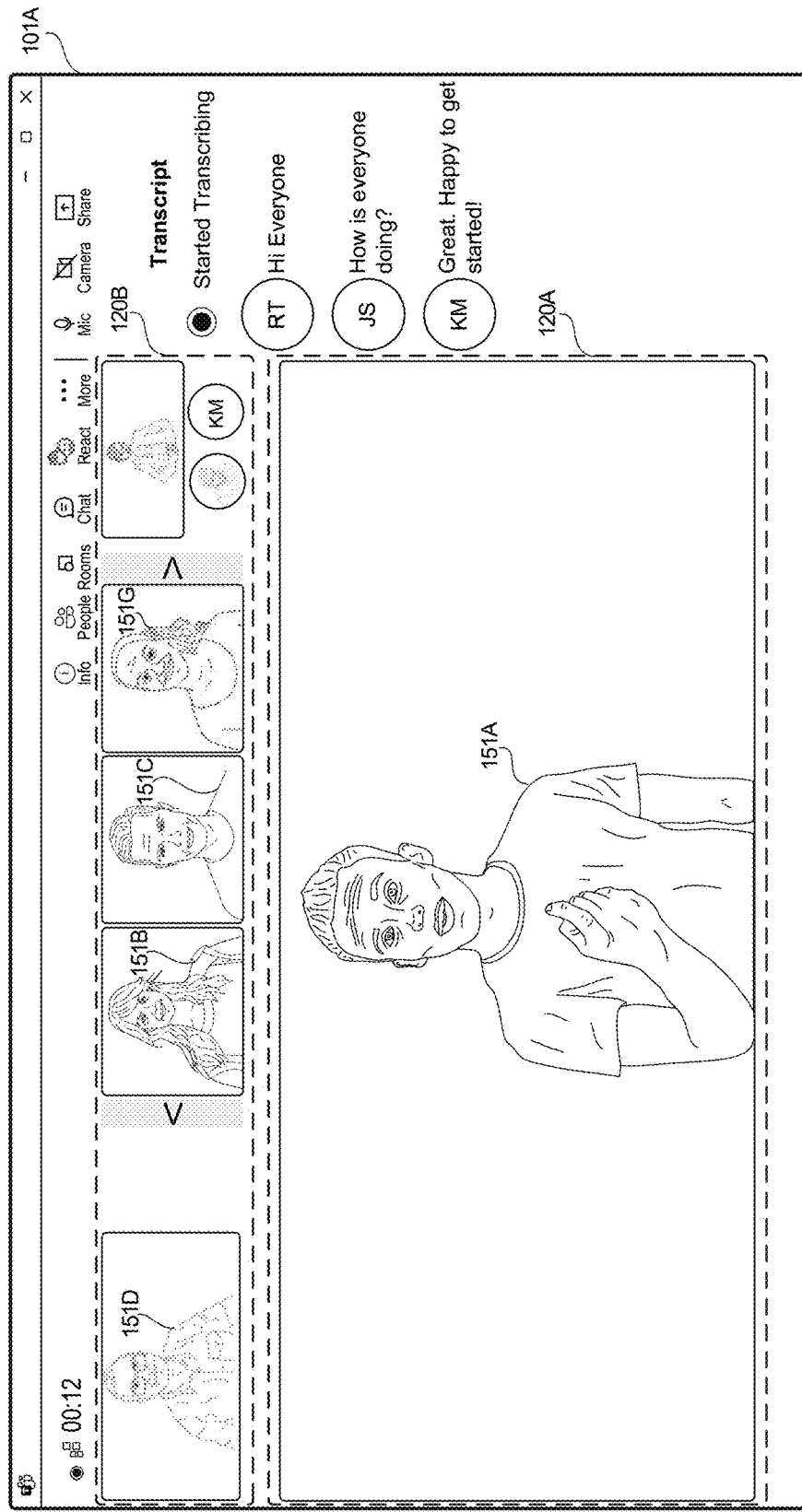
FIG. 1D shows a video of an assistant that is persistently displayed through a process where a user performs a regular pin on another user.
Figure 1D:
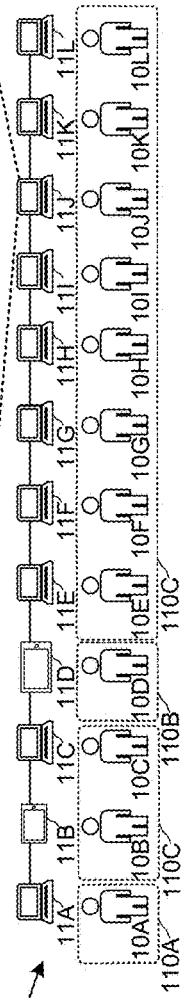
Figure 1E:
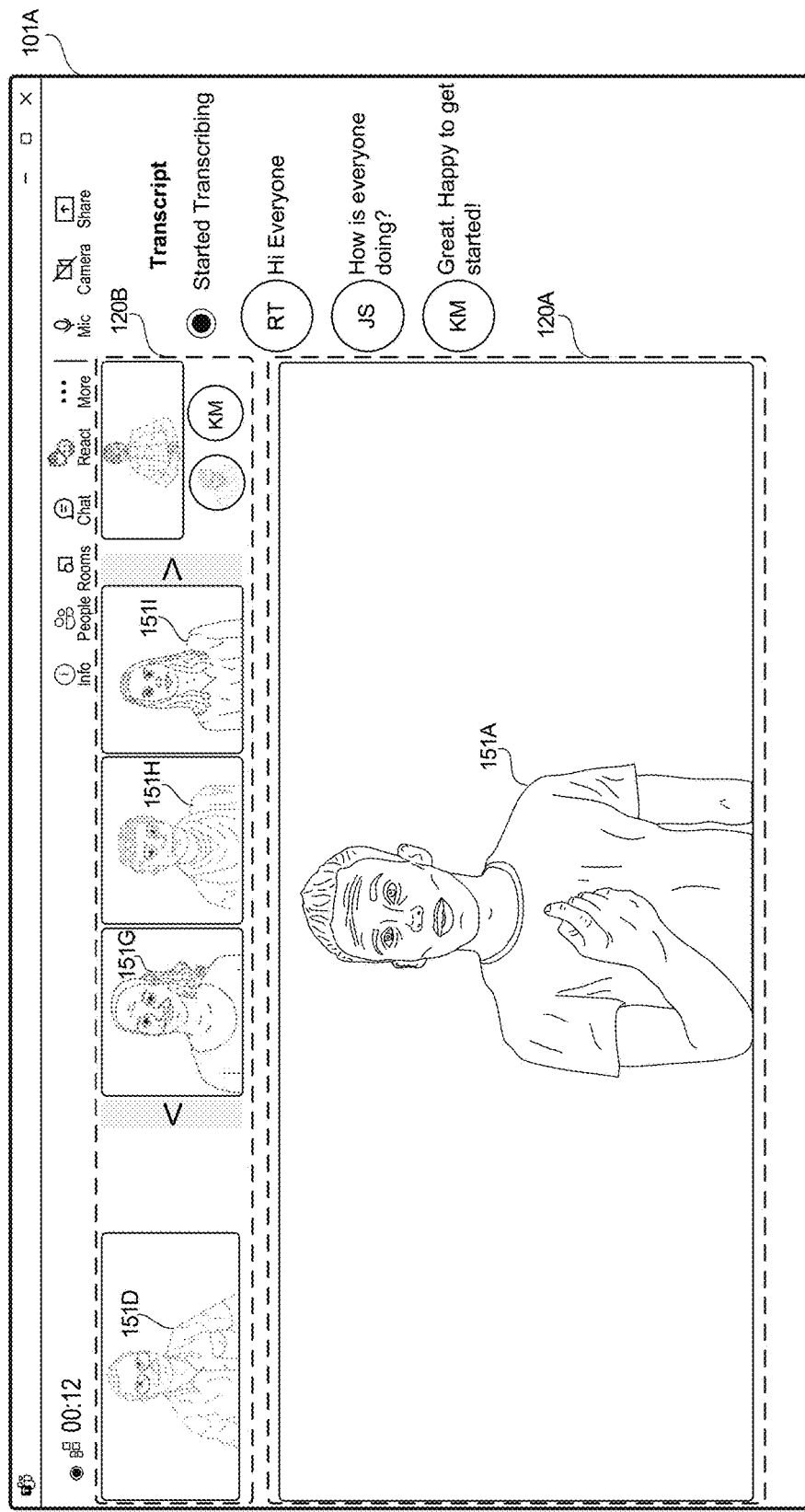
FIG. 1E shows a video of an assistant that is persistently displayed while the other videos of other users are rearranged based on vocal activity of the other users.

FIGS. 1C and 1D show how the video of the assistant is persistently displayed through a process where User J performs a regular pin on another User D. FIG. 1C shows how the fourth user 10D of the communication session is pinned in a fixed position in a user interface. In this example, the user selects the menu item "Pin for Me" and, as shown in FIG. 1D, this input causes the system to position the rendering 151D of the fourth user 10D in a position that is distinct from the other users in the secondary region 120B. The user can also select the "Pin for All" (a "spotlight" of that video) and cause the system to pin that selected video for the local computer as well as all other participants in the meeting. For illustrative purposes, a video that is spotlighted is also referred to herein as a video with a "regular pin." When the system selects a video using a regular pin, which is either "Pin for Me" or "Pin for All," the system locks that video in the secondary stage for certain actions, which are describe below as a first category of state changes. When the system positions a video using a regular pin, that video takes a second priority compared to any video that is persistently displayed in the primary stage 120A using a super pin. Thus, a video that is selected as a regular pin does not cause, and is restricted from causing, a video that is persistently displayed to be moved, resized, or removed, as shown in FIG. 1D.

Once selected for a regular pin, a pinned video, e.g., the rendering 151D of the fourth user 10D, is restricted from being moved or resized in response to the detection of a first category of state changes. A first category of state changes can include a state change involving the detection of an active speaker. When an active speaker is detected, the system can rearrange other video renderings that are not pinned. The rearrangement of the other video renderings can involve moving the most active speaker to a prominent position within a secondary stage 120B. For example, as shown in the transition between FIG. 1D and FIG. 1E, User G is moved from the left side the queue to the right side of the queue when the system detects that User G has a threshold level of communication, and User H and User I do not have a threshold level of communication. The threshold level of communication can include a threshold speaking volume, a threshold number of words, a threshold word rate (a number of words per unit of time), a threshold word count, a threshold level of physical movement captured by a camera, or a combination of such factors. When User G meets this criteria, User G causes the non-pinned videos to be moved. Although some video renderings, such as the renderings of User B, User C and User G, are rearranged, the pinned video of User D remains fixed as it is restricted from being moved or resized in this type of state change. In addition, User A, who is super pinned as an assistant, is also restricted from being moved or resized in response to the detection of a state change of the first category of state changes.

Figure 1F:
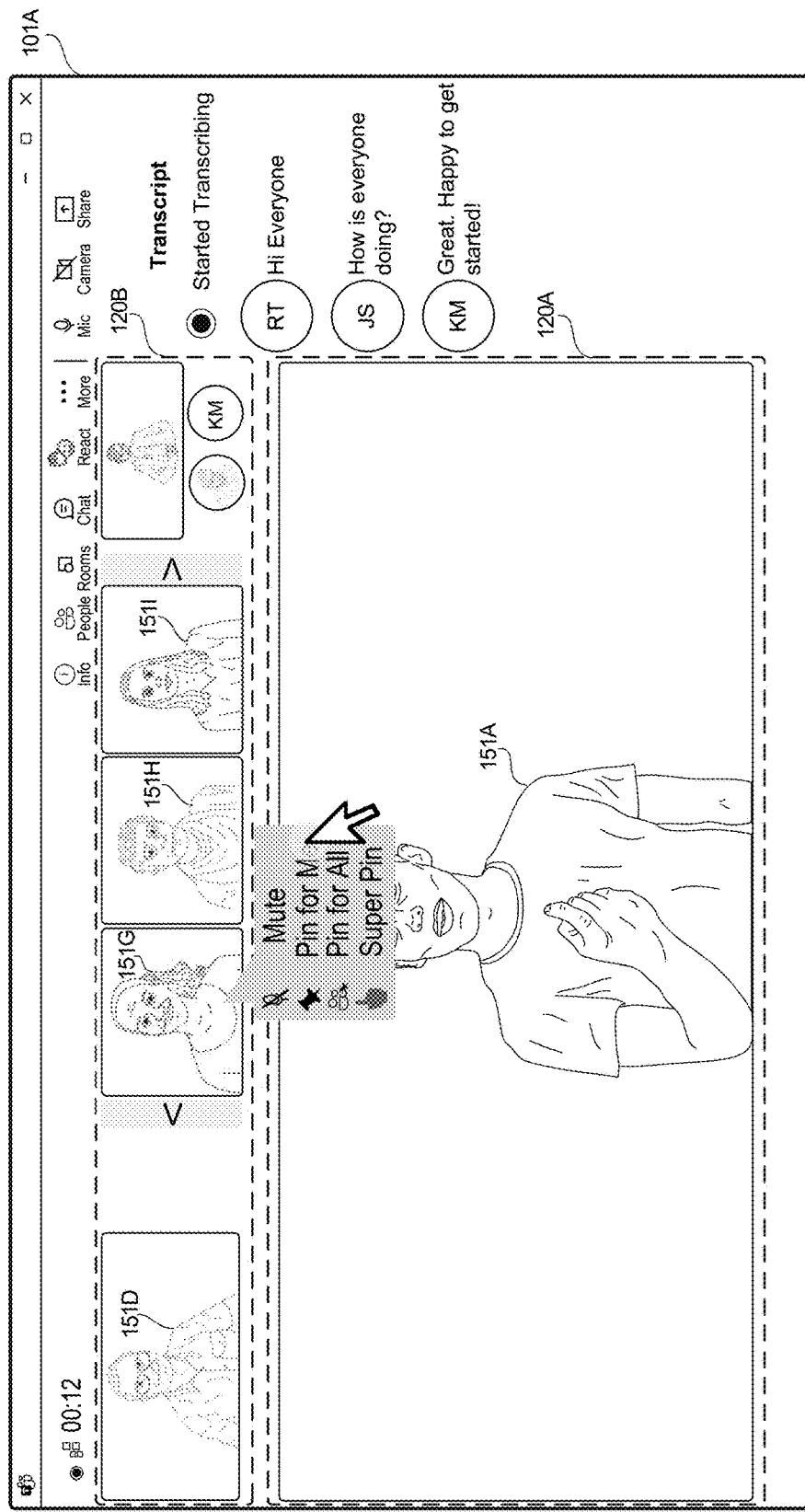
FIG. 1F shows how a second user of a communication session can be pinned in a position in a user interface.
Figure 1F:
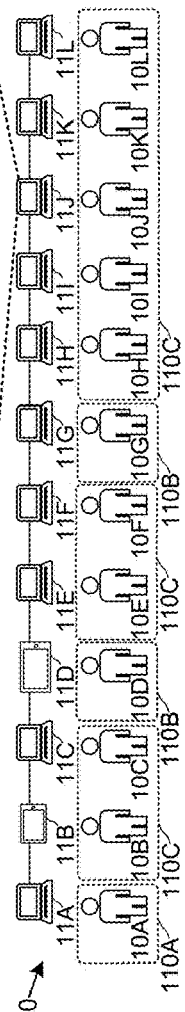
Figure 1G:
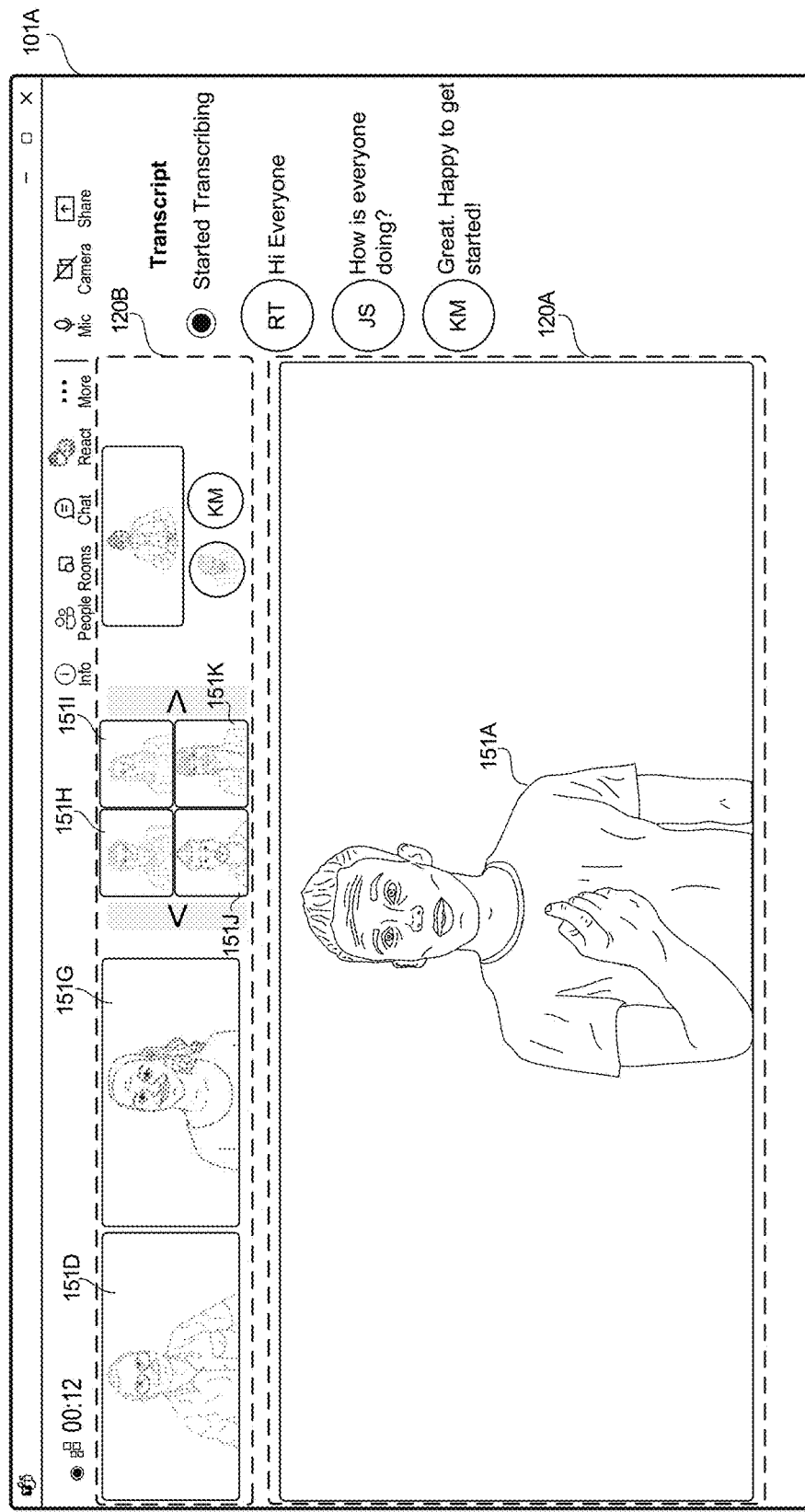
FIG. 1G shows how the video of the assistant is persistently displayed through a process where a second user is pinned.
Figure 1G:
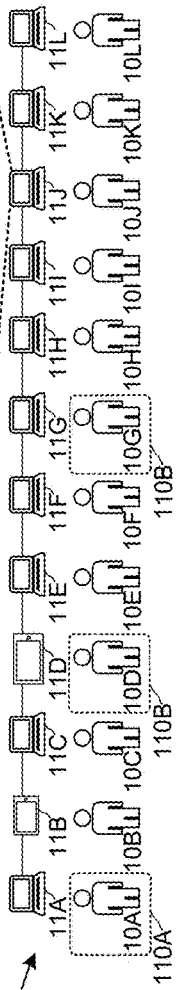

FIGS. 1F and 1G show how the video of the assistant is persistently displayed through a process where User J applies another regular pin to another user, User G. Similar to the example described above, once a regular pin is applied to the rendering 151G of User G, that rendering is fixed in position in response to the detection of a first category of state changes, e.g., active speakers, users joining a session, etc. Regardless of the number of renderings that are fixed in position using a regular pin, any rendering that is fixed using a super pin is restricted from movement or restricted from being reduced to a size smaller than a threshold size limit.

Figure 1H:
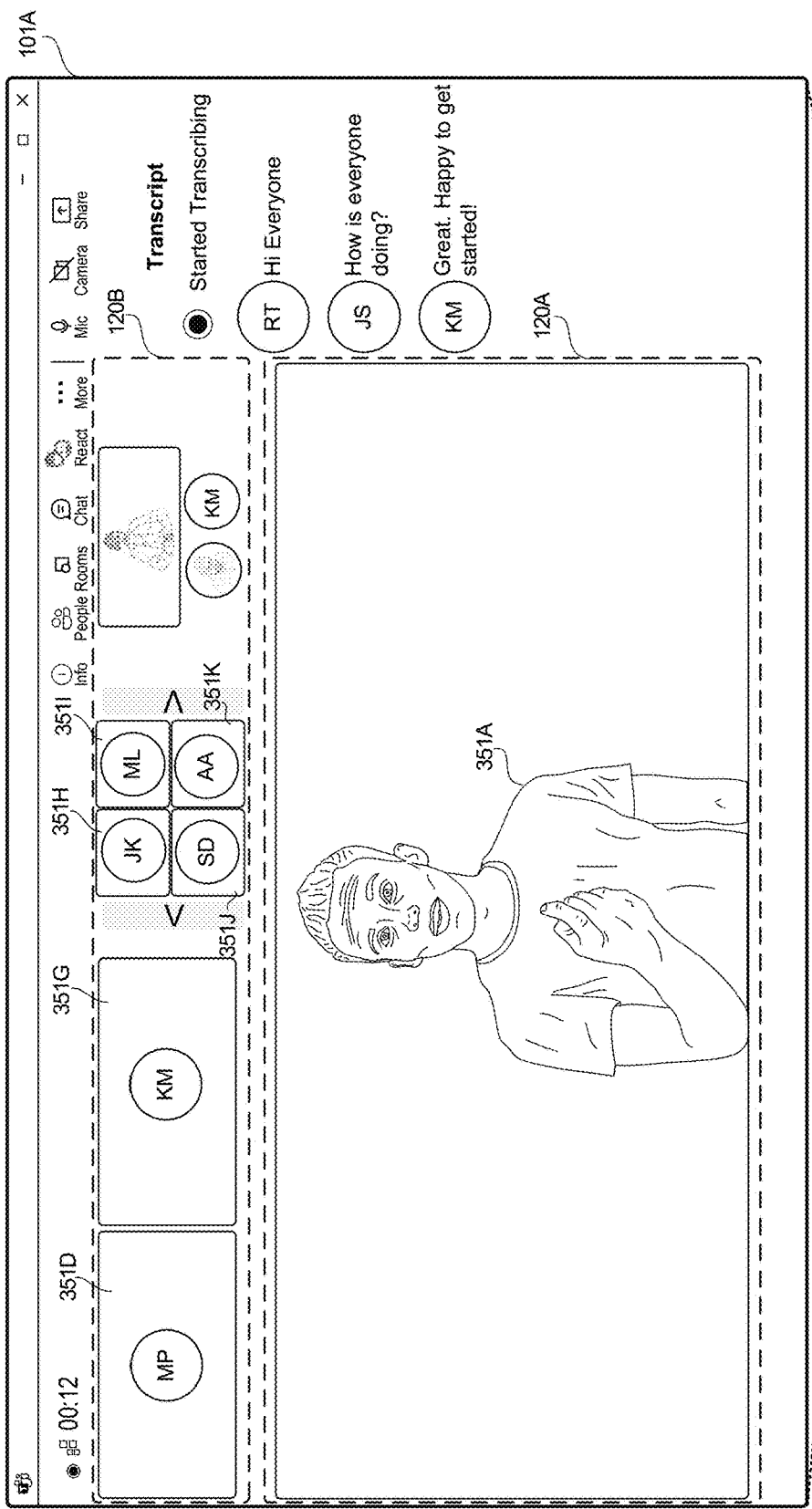
FIG. 1H shows how the video of the assistant is persistently displayed while the other videos of other users are transitioned to still images in response to the detection of low bandwidth.
Figure 1H:
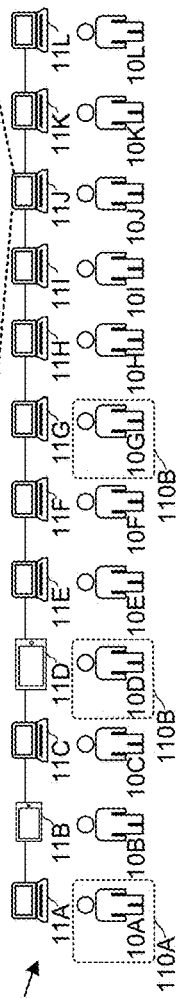

Referring now to FIG. 1H, an example showing another difference between a regular pin and a super pin is shown and described below. In this example, the system allows video renderings that are subject to a regular pin to be moved, resize, or removed when the system detects a state change from a second category of state changes. However, the videos that are subject to a super pin are restricted from being moved, resized, or removed when the system detects this type of state change. In one illustrative example, a state change of the second category of state changes can involve the detection of one or more computers experiencing connectivity issues, e.g., low network bandwidth is detected.

FIG. 1H shows how the video of User A is persistently displayed while the other videos of other users are removed and replaced with still images in response to the detection of low bandwidth. In this example, the system detects that at least one computer of the system is experiencing connectivity issues. This can include low bandwidth between each of the computers or low bandwidth with respect to at least one computer 11 of the system 100. When bandwidth of at least one computer drops below a threshold value, the system restricts the video of User A from being moved, removed or resized. However, when bandwidth of at least one computer drops below a threshold value, the system allows the moment, reduction or the removal of live video feeds the users in the secondary stage. This can occur even when a video is held under a regular pin. This particular example shows that the live video feeds of the users in the secondary stage 120B are removed and replaced with other representations, such as a still image of their initials or a still image showing the user. However, the live video feeds that are persistently displayed in the primary stage 120A are maintained in this type of event, e.g., when low bandwidth is detected.

Figure 2:
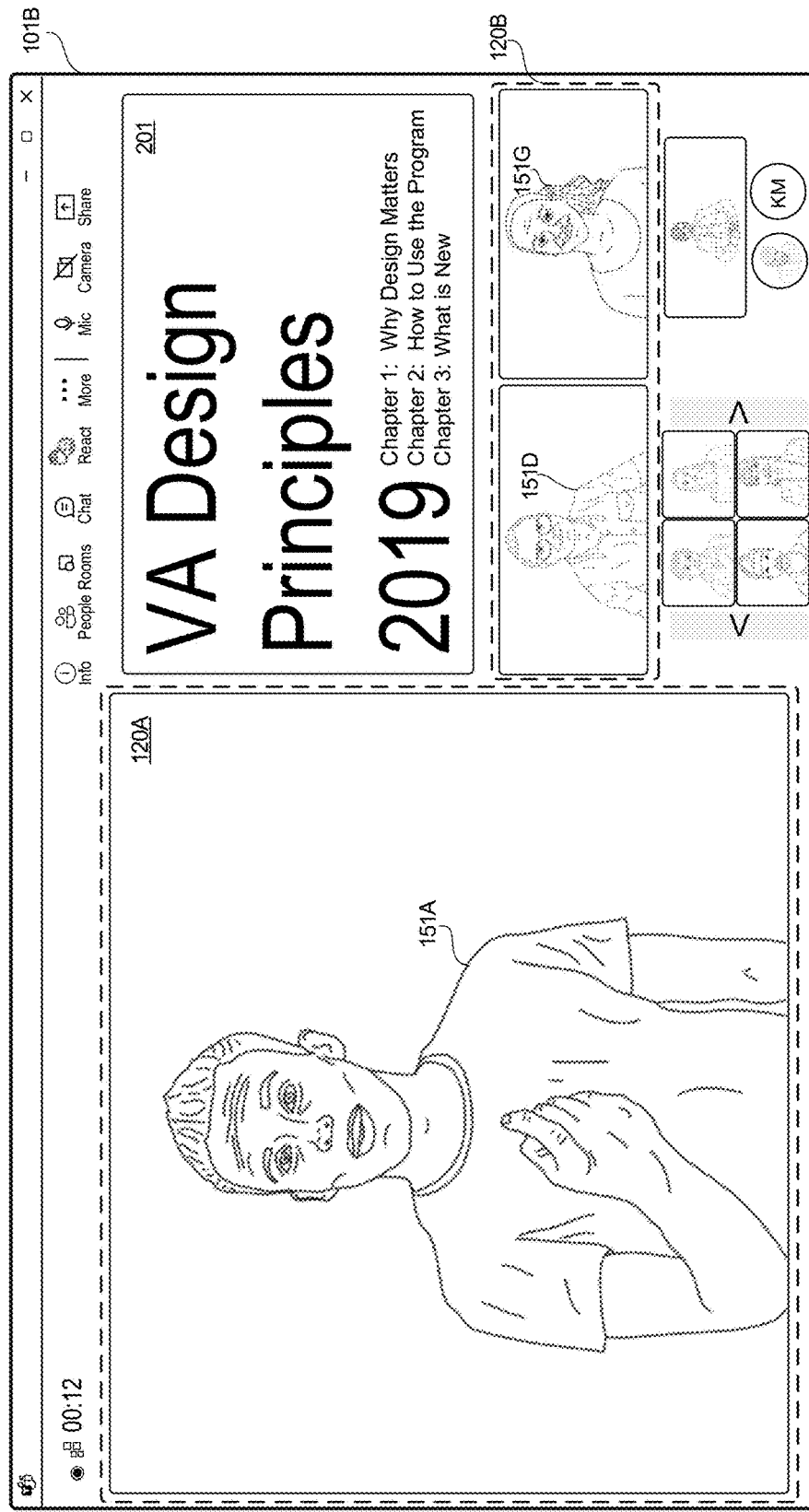
FIG. 2 shows an example of how the video of User A is persistently displayed while the other videos of other users are transitioned during a content share.
Figure 3:
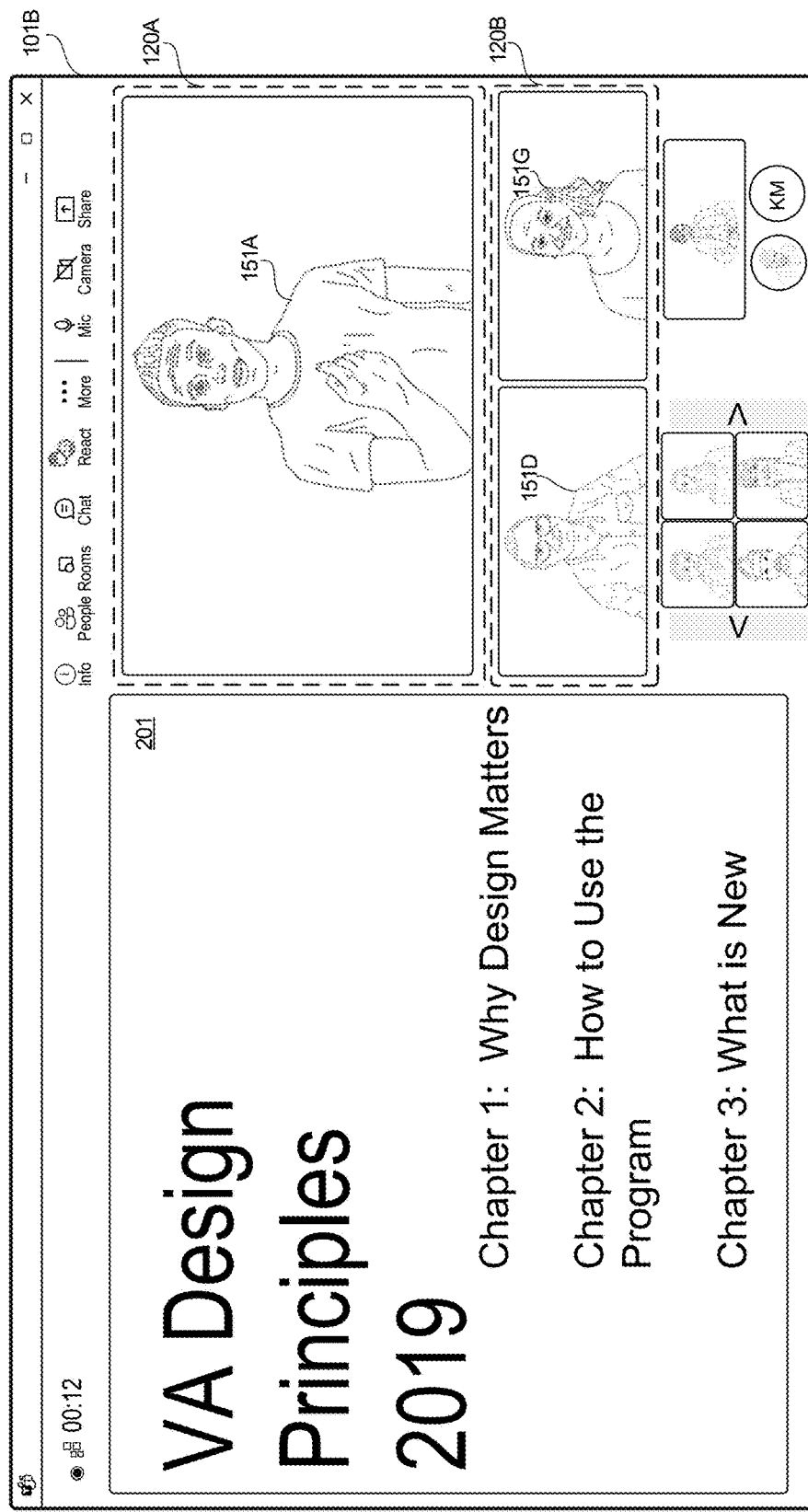
FIG. 3 shows an example of how the video of User A is persistently displayed and moved while the other videos of other users are transitioned during a content share.
Figure 3:
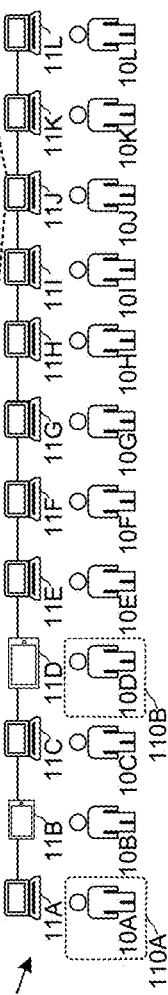

Referring now to FIG. 2 and FIG. 3, other examples showing additional differences between a regular pin and a super pin are shown and described below. In these examples, the system allows video renderings that are not pinned or video renderings that are subject to a regular pin to be moved, resize, or removed when the system detects a state change from a second category of state changes. However, the videos subject to a super pin are restricted from being moved, resized, or removed when the system detects this type of state change. In one illustrative example, a state change of the second category of state changes can involve the detection of one or more computers sharing content with the communication session.

FIG. 2 shows how the video of User A is persistently displayed while the other videos of other users are transitioned in response to the detection of shared content. In this example, one of the presenters, e.g., User G, started sharing a slide deck. In response to the detection of the shared content, the system maintains the position of the rendering of the assistant within the primary stage 120A. The aspect ratio of the rendering of the assistant can be modified, but the position of at least one selected point of the image, e.g., the bottom left corner of the image, or the upper left corner of the image, is maintained. The size of the rendering of the assistant can also be reduced to a threshold size to allow the viewer to have a concurrent view of a rendering 201 of the shared content and the rendering of the assistant. The other live stream renderings that are designated with a regular pin or the live stream renderings that are not pinned are relocated and/or resized. For instance, User D and User G are moved to the lower right portion of the user interface. The other live stream renderings, not including the videos designated with a regular pin or super pin, are relocated, resized, or removed.

FIG. 3 shows another example of how the video of User A can be persistently displayed while the other videos of other users are transitioned in response to the detection of a second category of state changes, e.g., detection of shared content. In this example, one of the presenters, e.g., User G, started sharing a slide deck. In response to the detection of shared content, the system maintains a minimum size of the rendering of the assistant and moves the rendering 151A to a new location. Thus, although the persistently displayed user is moved and resized, the reduction is restricted from exceeding a predetermined minimum size. The minimum size is also referred to herein as a "threshold minimum size" for a rendering 151A of the assistant 10A, or a user having a role that corresponds to a prerequisite of a viewing user. This limitation of the reduction allows the user to intelligibility view the assistant with clarity while the shared content is concurrently displayed.

In some embodiments, the threshold minimum size may be based on the device type or a screen size. For instance, for a desktop computer or a device having a twenty two inch monitor, the threshold minimum size may be a predetermined percentage of the screen, e.g., 50%, of one dimension of the screen. However, for a tablet or mobile device or a device having a five inch screen, the threshold minimum size may be a greater predetermined percentage of the screen, e.g., 90%, of one dimension of the screen. Although screen dimensions are used in this example other units of measure can be utilized. For instance, if a device screen has less than a threshold number of pixels, e.g., two million, the system may use a first threshold minimum size; and if a device screen has more than the threshold number of pixels, the system may use a second threshold minimum size for the rendering of the assistant 10A, where in this example, the first threshold minimum size is greater than the second threshold minimum size. The threshold minimum sizes can be based on a number of pixels or one or more dimensions of the rendering. This allows a system to use more of the screen for a rendering of the assistant 10A for smaller screen devices. The threshold minimum size can apply to any rendering 151A of an assistant 10A, or a user having a role that corresponds to a prerequisite of a viewing user.

The rendering of the assistant has a higher priority over the renderings of other video streams. The assistant or a user, such as User A, that is selected to be persistently displayed is defined herein as a user that has a role that corresponds to one or more prerequisites of a viewing user, e.g., User J, the viewer of the user interface. The movement of the persistently displayed can also be limited to a threshold distance. Thus, when an assistant is persistently displayed in a primary stage 120A, the system limits the movement of that rendering to a threshold vertical distance or a threshold horizontal distance. Such embodiments allow the viewer to maintain a view with their designated assistant. Also shown in FIG. 3, the other live stream renderings that are designated with a regular pin or other renderings that are not pinned are relocated, resized and/or removed. For instance, renderings for User D and User G may be moved to the lower right portion of the user interface. The other live stream renderings that are not pinned are relocated, resized, or removed. For instance, User H or User I may be moved the lower right portion of the user interface or removed altogether.

In addition to the differences described above, there are a number of other differences between a regular pin and a super pin. For instance, a video that is selected for a regular pin does not persist across communication sessions. Users have to select videos for regular pins for each meeting they join. However, a video that is selected for a super pin persists across communication sessions. The persistence across communication sessions can be achieved by storing data that associate's a particular assistant with a participant. For example, once User A is identified as an assistant for User J, the identity for User A may be stored in a setting indicating that User A is an assistant to User J. Each time User J joins a meeting, that setting is accessed and a user interface that is displayed to User J will automatically display a rendering of User A in a designated region 120A.

Figure 4:
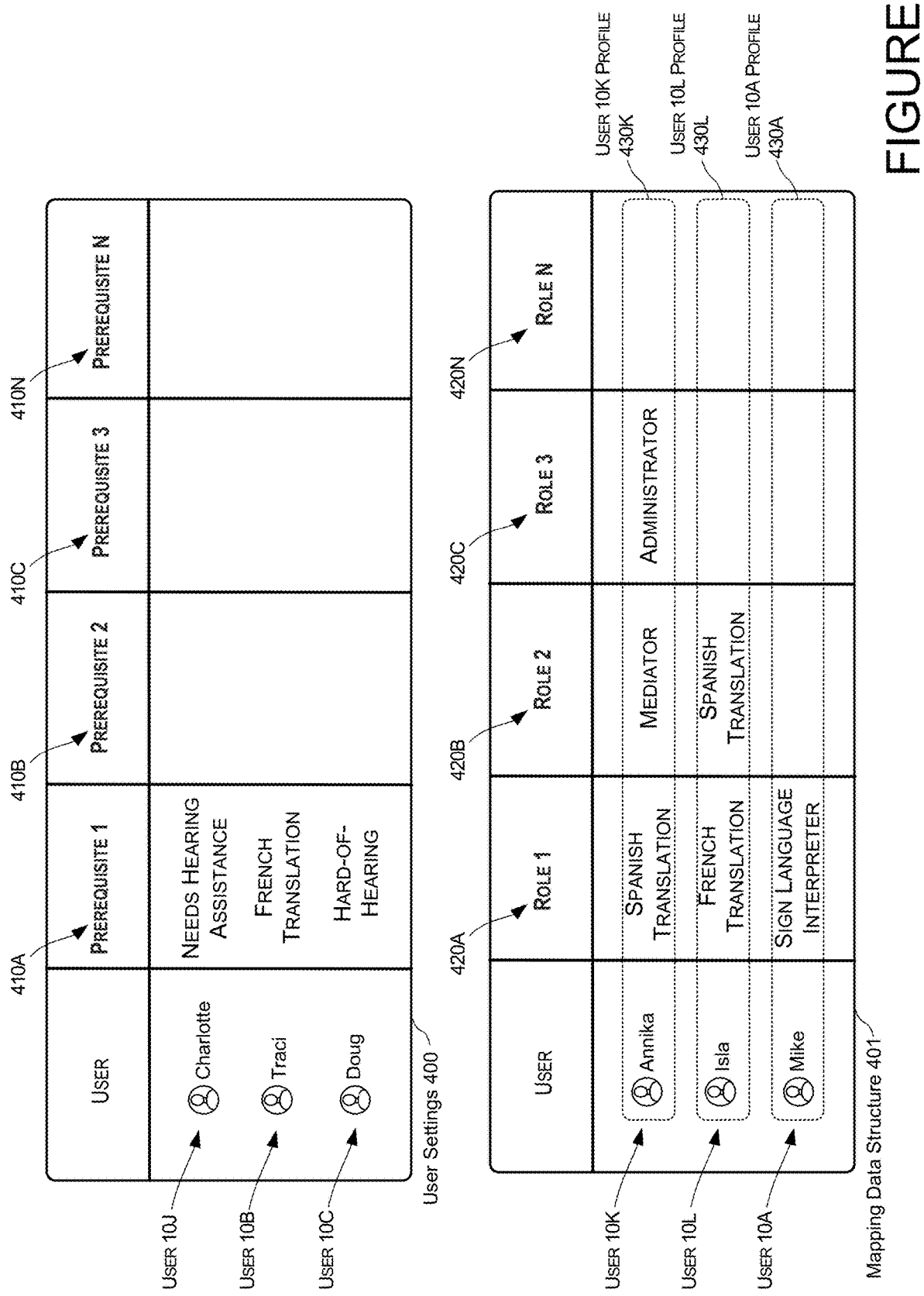
FIG. 4 shows an example of user settings and a mapping data structure.

In other embodiments, as shown in FIG. 4, the persistence across communication sessions can be achieved by storing user settings 400 that associate prerequisites 410 with one or more user identities for individual users 10. FIG. 4 shows an example of user settings 400 and a mapping data structure 401. In general, the user settings can define prerequisites for certain users. For instance, User J has a prerequisite that indicates they are in need of hearing assistance, User B has a prerequisite that indicates they are in need of a French translator, and User C has a first prerequisite that indicates they are in need of hearing assistance, e.g., listed that they are hard-of-hearing. Each user can have a number of assistants. For instance, some users can indicate they are in need of two sign language interpreters. The mapping data structure of 401 can define a number of profiles 430. Each profile can identify roles for each user. For instance, User K can participate in a meeting as a Spanish translator, a mediator or an administrator; User L can participate in a meeting as a French translator or a Spanish translator; and User A can participate in a meeting as a sign language interpreter.

The settings 400 are stored in a manner that allows the system 100 to access the settings each time a user joins a meeting. When a meeting participant, such as User J, joins a meeting, the system accesses the user settings and determines if one of the prerequisites 410A associated with the meeting participant, User 10J, corresponds to a role 410A of another user, such as User A. When the role of a particular user is determined to correspond with a prerequisite of the meeting attendee, the system selects that particular user as an assistant to the meeting attendee. The system then persistently displays a rendering of the assistant in a user interface as described herein.

The settings 400 can also be referred to herein as "accessibility setting." The accessibility settings can be any data structure, document, or other form of data that defines a person's needs and associates those needs with their identity. For example, a profile or registration data at the operating system level or application level can indicate that a user has drivers and equipment for a particular accessibility need. That data can be used to indicate a prerequisite that a person is hard-of-hearing, etc. In another example, emails or communication data indicating a person's accessibility needs can also be utilized to indicate a prerequisite of a user and invoke the operations disclosed herein. If a use has specific applications installed on their phone, e.g., a sign language application, such data can also be used to prerequisite of a user and invoke the operations disclosed herein. The settings 400 can be at any stack or level, such as OS, user profile, application level, etc.

In some embodiments, the system may limit the number of assistants for a particular user. For instance, the system may limit User J to only two assistants. This limitation allows the system to provided intelligible display of each assistant, as a large number of assistants may cause the display of smaller renderings which may be difficult to see.

Figure 5:
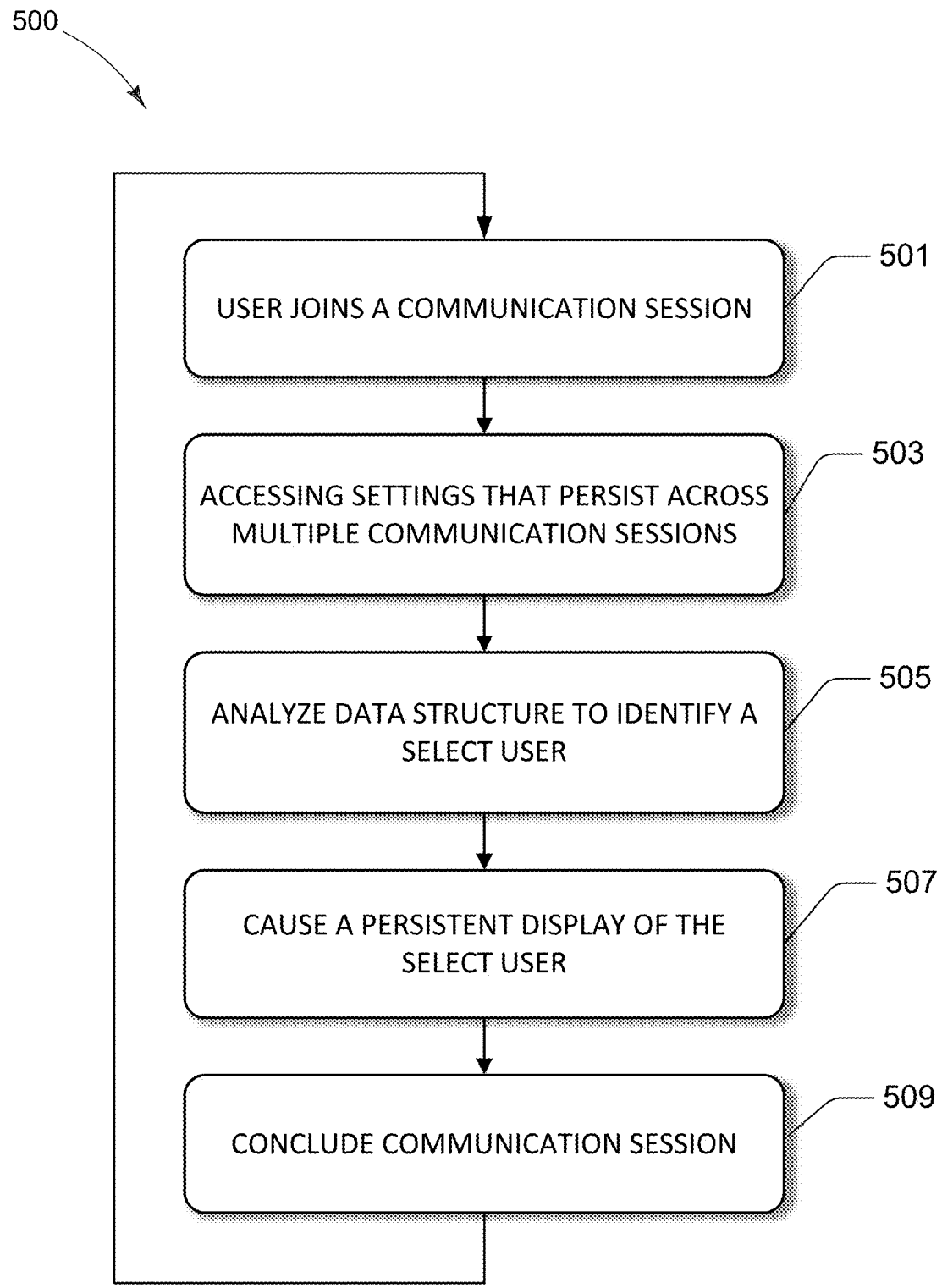
FIG. 5 is a flow diagram showing aspects of a routine for utilizing the disclosed techniques.

FIG. 5 is a diagram illustrating aspects of a routine 500 for providing persistent participant prioritization across communication sessions. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can start or end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 5 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 500 includes an operation 501 where the system detects that a user of a computer joins a communication session. The communication session can be in the form of an online meeting and a user, such as User J, can join using a communication application that is configure to display live video streams of multiple users.

At operation 503, the system accesses settings 400 that persist across multiple communication sessions for a user 10J. The settings define individual prerequisites 410 for the user 10J. The access to the settings is automatically performed by the system without user input. The use of the settings causes the system to select at least one select user 10A having a role 420A that corresponds to at least one prerequisite 410A of the user 10J. The selection is performed automatically by the system 100 in response to the user 10J joining a communication session. An example of the settings is shown in FIG. 4.

At operation 505 the system analyzes a data structure 401 that relates individual users, e.g., User 10A, User 10K, and User 10 with one or more roles 420. The analysis of the data structure causes the system to identify one or more user profiles 430A of the at least one select user 10A having the role 420A that corresponds to the at least one prerequisite 410A of the user 10J. For instance, a role such as a sign language interpreter can't be determined to correspond with a particular prerequisite, e.g., in need of hearing assistance.

Operation 505 can involve a keyword match, a pseudo keyword match, or by the use of other types of matching processes, which may include heuristic-based operations. For instance, keywords can be stored in association with a role of a person, and when that role has a keyword match or a threshold contextual match with a prerequisite of an attendee, that person may be assigned as a persistently displayed assistant for the attendee. In some configuration, the system can determine that a role of a candidate corresponds to the at least one prerequisite of the user by identifying at least one of a keyword match between the role and the at least one prerequisite. In addition or alternatively, the system can perform a phrase match between the role and the at least one prerequisite. In addition, or alternatively, a character matching between the role and the at least one prerequisite can be performed by applying historical data to a heuristic-based operation. Thus, a match between a prerequisite of a user and a role that corresponds to that prerequisite can improve through iterations of the routine 500.

Machine learning techniques can be utilized such that future iterations of the routine 500 can improve upon the discovery and selection of each assistant. Users can provide feedback to the system by approving or denying each selected assistant, e.g., they may be rated. That feedback can be used to refine the process of selecting one or more assistants in each iteration of the routine.

At operation 507, the system can cause the persistent display of a selected assistant. In some configurations, the system can cause a display of a rendering of a video stream 151A of the at least one select user 10A within a designated region 120A of a user interface 101A rendered on a device 11J associated with the user 10J having the at least one prerequisite 410A that corresponds stream of the at least one select user is not displayed on display devices of other users, e.g., User 10A through User 10I and User 10L, that do not have the prerequisite that corresponds to the role of the at least one select user. Thus, the persistent display of a selected assistant may only be displayed for users having prerequisites that correspond to a role of the selected assistant, and other users not having prerequisites that correspond to a role of the selected assistant are restricted from a persistent display of an assistant. Thus, in the example of FIGS. 1A-4, the Charlotte's computer 11J persistently displays a rendering of Mike's 10A video. But since Traci and Doug do not have a requirement for a sign language interpreter, their respective computers 11B and 11C do not persistently displays a rendering of Mike's 10A video in a designated region.

For illustrative purposes, a "persistent display" of a video remains displayed in the event of a first category of state changes and a second category of state changes of the communication session. A first category of state changes can include the detection of an active speaker, detection of a user joining a meeting, detection of a user leaving a meeting, etc. A second category of state changes can include the detection of low bandwidth of the communication session. A detection of low bandwidth of the communication session can occur when one or more of the computers 11 detects a network connection that falls below a threshold network transfer rate. The second category of state changes can also include the detection of shared content. This can occur when a participant of a meeting shares content for display on the computing devices of other participants.

The video streams that are selected for a regular pin may be restricted from being moved, resized or removed, in the event of a state change from the first category of state changes. However, the video streams that are selected for a regular pin may be moved, resized or removed in the event of a state change from the second category of state changes. A regular pin may also include videos that are "spotlighted." Spotlighting of a video occurs when a person selects a video and that selection from one user pins that video on the devices of other users. Thus, if User J spotlights a video of User G, the video of User G would be pinned in a fixed position in the secondary stage on the computing devices of other participants in the communication session. When spotlighting videos are detected, the system prioritizes a video that is super pinned over a video that is spotlighted. Thus, the system restricts a super pinned video from being moved, resized or removed from a user interface when a spotlighted video is introduce to that user interface, where a super pinned video is a video of an assistant that is displayed in response to determining that the assistant has a role that corresponds to a prerequisite of a user viewing the user interface.

The system can also display multiple assistants for a particular user. For instance, two sign language interpreters can be assigned to User J. This can occur if the user preferences indicate the need for two sign language interpreters. In this case, the primary stage would be populated with two video renderings and each video rendering would be persistently displayed. These video renderings would not be interrupted by the state changes described herein, including the detection of active speakers, the detection of new people joining a meeting, the detection of low bandwidth, and the detection of content sharing.

In some configurations, the system can limit the number of assistants a particular user may have. For instance, even when a user has prerequisites for three sigh language interpreters, the system can be configured to limit the display to two sigh language interpreters. This limitation provides a technical benefit in the fact that the system can maintain a persistent display of each assistant at a suitable size. In some embodiments, the limit may vary based on the device type or a screen size. For instance, for a desktop computer, the limit may be three assistants but for a smaller device such as a tablet or a phone, limit maybe two assistants.

At operation 509, upon conclusion of the communication session, e.g., after the end of a meeting, the routine can enter a wait state until the user, e.g., User J, joins another meeting. At which time the routine returns to operation 501 where another user is selected as an assistant.

For illustrative purposes, the persistent display of a select video can also mean that a video is not moved and/or resized beyond a threshold level. Thus, a persistent display of a video can be moved but not beyond a threshold distance, or a persistent display of a video can be resized but not below a threshold size. This means that a persistent display of a video can be reduced but the reduction is limited. The reduction limit can be a percent of a screen, e.g., not less than 50% of a screen or user interface. The reduction limit can include a limit of a pixel measurement or any other type of limit that maintains a desired size of the persistent rendering.

In some embodiments, some renderings are restricted from movement. For illustrative purposes, a rendering that is "moved" in response to the detection of a state change includes moving the rendering from a first position to a second position. This can include selecting a point in the rendering, e.g., the lower left corner of a video rendering, determining a position (X, Y) for that point using a coordinate system, then moving that point to a new position. Thus, when a rendering is restricted from moving, a selected point of that rendering may be restricted from moving from a first position to a second position. Thus, a rendering can be resized, e.g., a number of pixels can be reduced, but the rendering can be restricted from moving with respect to the selected point, e.g., the lower left corner remains fixed in its original position. When it comes to a rendering of an assistant, e.g., a person having a role that corresponds to a prerequisite of a viewer, that video can be reduced in size to a minimum size but not be reduced beyond that minimum size.

The one or more of the operations described above can also include a data structure having a hierarchy of preferences (stack/level) where the viewer can select a first set of participants ("super pin" for a language interpreter) that are locked within the primary stage. The viewer can also select a second set of participants (regular "pin") that are locked within a secondary stage. The participants with the regular pin are locked in position when other people who are talking are rotated in the secondary stage. But the participants with the regular pin can be moved or removed in response to certain events, e.g., low bandwidth, shared content, etc.

The operations can include accessing a data structure (201) (user settings) defining individual priority levels assigned to individual groups (110) of participants (11) of one or more communication sessions, access to the data structure persisting across multiple communication sessions, wherein a first priority level causes the system (100) to display renderings of a first set of participants (110A) (interpreters) having a designated role within a first designated region (120A) of a user interface (101), the data structure defining permissions that restrict movement of the renderings of the first set of participants (110A) within the first designated region (120A) in response to a state change of the communication session (interpreter locked in state change: low bandwidth meeting), a second priority level causes the system to display renderings of a second set of participants (110B) within a second designated region (120B), wherein the permissions allow movement or to be removed of the renderings of the second set of participants (110B) within the second designated region (120B) in response to the state change of the communication session (Regular Pinned users can move or be removed in state change: low bandwidth), the permissions restricting movement of the renderings of the second set of participants (110B) during other state changes Regular Pinned users can be moved based on user activity: active speaker being promoted, etc. Also, in some embodiments, regular pinned videos are smaller than a video of super pinned videos, e.g., an interpreter. Regular pinned individuals, including spotlight videos, do not persist over different meetings. Regular pinned videos are set by the user in each meeting.

The operations also include causing a display of a first user interface arrangement (101A) comprising a rendering of the first set of participants (110A) having the first priority level, a rendering of the second set of participants (110B) having the second priority level, and a rendering of other participants (110C), wherein the rendering of the first set of participants (110A) is positioned in the first designated region (120A) and the second set of participants (110B) is positioned in the second designated region (120B), and renderings of the other participants (110C) are positioned in the second designated region (120B). This is shown in the drawings as Sign Language Interpreter who is "super pinned" is in the primary stage 120A, other users who are pinned are in the secondary stage 120B.

The operations also include receiving an input indicating the state change of the communication session, wherein the state change includes at least one of at least one participant sharing content for display on devices of the participants (11) of a communication session or an indication that bandwidth of the communication session is below a bandwidth threshold.

The operations also include using the permissions of the data structure (201) to cause a transition from the first user interface arrangement (101A) to a second user interface arrangement (101B) comprising the rendering of the first set of participants (110A) having the first priority level, wherein a rendering of a first participant (151A) of the first set of participants (110A) is maintained to at least a threshold size within the first designated region (120A), wherein the rendering of the second set of participants (110B) and the renderings of the other participants (110C) are resized to accommodate the state change (content 201 displayed FIGS. 2A/2B, low bandwidth or content share), wherein an arrangement of the rendering of the second set of participants (110B) is maintained within the second designated region (120B) while the renderings of the other participants (110C) are re-arranged due to user activity.

Figure 6:
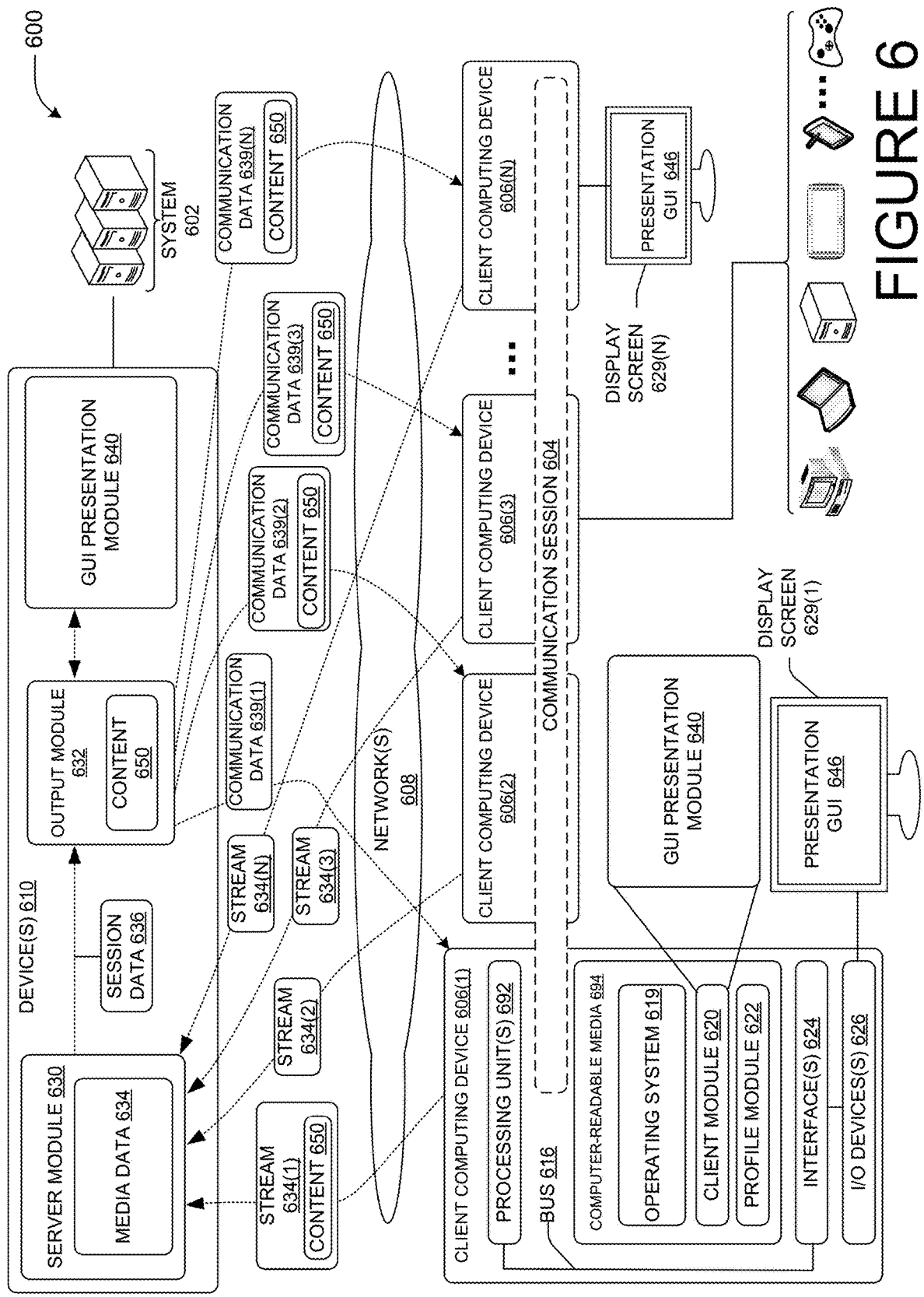
FIG. 6 is a computer architecture diagram illustrating an illustrative computer hardware and software architecture for a computing system capable of implementing aspects of the techniques and technologies presented herein.

FIG. 6 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 6 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 6 illustrates that client computing device 606(1) is in some way connected to a display device (e.g., a display screen 629(N)), which can display a UI according to the techniques described herein.

In the example environment 600 of FIG. 6, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 6) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 6, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 7:
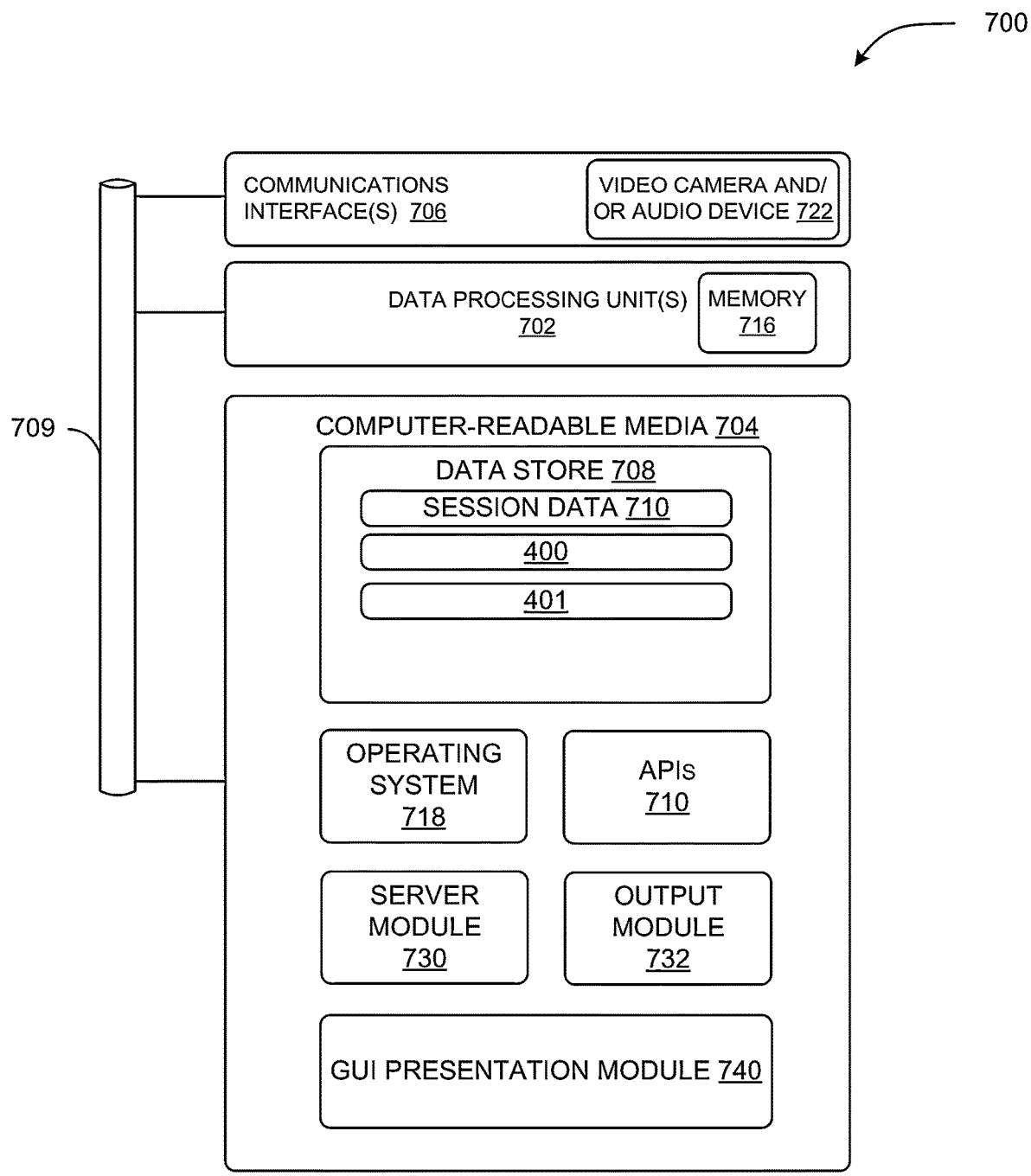
FIG. 7 is a computer architecture diagram illustrating a computing device architecture for a computing device capable of implementing aspects of the techniques and technologies presented herein.

FIG. 7 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 6), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10L each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This contextual information can also be fed into any of the models to help bring emphasis to keywords spoken by a person at a specific level, highlight a UI when a background sound of a person at a certain level is detected, or change a sentiment display in a particular way when a person at a certain level is detected has a certain sentiment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

The following Clauses are to further the present disclosure:

Clause A: A computer-implemented method for providing persistent participant prioritization across communication sessions, the method for execution on a system (100), the method comprising: accessing settings (400) that persist across multiple communication sessions for a user (10J), the settings define individual prerequisites (410) for the user (10J), the access to the settings is automatically performed by the system without user input, where the access to the settings and a selection of at least one select user (10A) having a role (420A) that corresponds to at least one prerequisite (410A) of the user (10J) is performed automatically by the system (100) in response to the user (10J) joining a communication session; analyzing a data structure (401) that relates individual users (10A 10K 10L) with one or more roles (420), wherein the analysis of the data structure identifies one or more user profiles (430A) of the at least one select user (10A) having the role (420A) that corresponds to the at least one prerequisite (410A) of the user (10J); and causing a display of a rendering of a video stream (151A) of the at least one select user (10A) within a designated region (120A) of a user interface (101A) rendered on a device (11J) associated with the user (10J), wherein the user (10J) has the at least one prerequisite (410A) that corresponds to the role (420A) of the at least one select user (10A), wherein the display of the rendering of the video stream of the at least one select user (10A) is not displayed on display devices of other users (10A-10I, and 10L) that do not have a setting that includes the prerequisite that corresponds to the role of the at least one select user.

Clause B: The computer-implemented method of Clause A, wherein the system accesses the settings in response to the user joining the communication session for enabling the system to automatically display the at least one select user in the user interface without requiring an input from the user, permissions for the settings are configured to allow the system to access settings prior to the user joining the session to enable the system to display the at least one select user in the designated region when the user joins the communication session.

Clause C: The computer-implemented method of Clauses A through B, wherein one or more permissions restrict movement of the rendering of the video stream (151A) of the at least one select user (10A) within the designated region (120A) of a user interface in response to in response to a predetermined state change of the communication session, wherein the state change includes at least one of a detection of a data rate of at least one computing device of the communication session below a data rate threshold.

Clause D: The computer-implemented method of Clauses A through C, wherein one or more permissions restrict movement of the rendering of the video stream (151A) of the at least one select user (10A) within the designated region (120A) of a user interface in response to in response to a predetermined state change of the communication session, wherein the state change includes at least one of a detection of shared content provided by at least one participant of the communication session for display on a primary region of one or more computing devices participating in the communication session.

Clause E: The computer-implemented method of Clauses A through D, wherein one or more permissions restrict movement of the rendering of the video stream (151A) of the at least one select user (10A) within the designated region (120A) of a user interface in response to in response to a predetermined state change of the communication session, wherein the state change includes at least one of a detection of shared content provided by at least one participant of the communication session, or modifications of renderings of other participants of the communication session based on a new user joining the communication session or an active speaker reaching a threshold for speech activity.

Clause F: The computer-implemented method of Clauses A through E, further comprising: determining that the role corresponds to the at least one prerequisite of the user by identifying at least one of a keyword match between the role and the at least one prerequisite, a phrase match between the role and the at least one prerequisite, or a character using match between the role and the at least one prerequisite by applying historical data to a heuristic-based operation.

Clause G: The computer-implemented method of Clauses A through F, wherein one or more permissions restrict movement of the rendering of the video stream (151A) of the at least one select user (10A) within the designated region (120A) of a user interface in response to in response to a predetermined state change of the communication session, wherein the state change includes at least one of a detection of shared content provided by at least one participant of the communication session, or modifications of renderings of other participants of the communication session based on a new user joining the communication session or an active speaker reaching a threshold for speech activity, wherein renderings of a second set of users displayed in a second designated region are configured to be modified in response to the state change.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A computer-implemented method for providing persistent participant prioritization across communication sessions, the method for execution on a system, the method comprising:

automatically accessing settings of a user of a communication session, wherein the settings persist across multiple communication sessions, and define individual prerequisites for the user based on the settings of the user, determining that at least one prerequisite of the user maps to a required role of another user;

analyzing a data structure that relates individual users in the communication session, the data structure specifies one or more roles of the individual users in the communication session;

based on the analysis of the data structure, identifying at least one select user of the communication session having the role that corresponds to the at least one prerequisite of the user, wherein the at least one select user is different from the user; and during the communication session:

causing a display of video streams of the communication session on a user interface rendered on a device associated with the user and on respective devices associated with other users of the communication session;

in response to the at least one prerequisite in the settings of the user, causing a persistent display of a rendering of a video stream of the at least one select user within a designated region on the device associated with the user, wherein the user has the at least one prerequisite that corresponds to the role of the at least one select user, the persistent display of the video stream of the at least one select user is not provided to other users in the communication that do not have a setting that includes the prerequisite that corresponds to the role of the at least one select user; and in response to detected changes of activities in the communication session:

modifying the video streams of the communication session rendered on the device associated with the user and on the respective devices associated with other users of the communication session, to reflect the changes of activities in the communication session; and maintaining the rendering of the persistent video stream of the at least one select user on the device of the user by maintaining a location or a size of the persistent display despite of the video streams of the communication session being modified to reflect the changes of activities in the communication session, wherein the rendering of the video stream of the at least one select user on the respective devices associated with other users is moved or resized depending on the changes of activities in the communication session.

2. The computer-implemented method of claim 1, wherein the system accesses the settings in response to the user joining the communication session for enabling the system to automatically display the at least one select user in the user interface without requiring an input from the user, permissions for the settings are configured to allow the system to access settings prior to the user joining the session to enable the system to display the at least one select user in the designated region when the user joins the communication session.

3. The computer-implemented method of claim 1, wherein one or more permissions restrict movement of the rendering of the video stream of the at least one select user within the designated region of a user interface in response to the detected changes of activities, wherein the detected changes of activities includes at least one of a detection of a data rate of at least one computing device of the communication session below a data rate threshold.

4. The computer-implemented method of claim 1, wherein one or more permissions restrict movement of the rendering of the video stream of the at least one select user within the designated region of a user interface in response to the detected changes of activities, wherein the detected changes of activities includes at least one of a detection of shared content provided by at least one participant of the communication session for display on a primary region of one or more computing devices participating in the communication session.

5. The computer-implemented method of claim 1, wherein one or more permissions restrict movement of the rendering of the video stream of the at least one select user within the designated region of a user interface in response to the detected changes of activities, wherein the detected changes of activities includes at least one of a detection of shared content provided by at least one participant of the communication session, or modifications of renderings of other participants of the communication session based on a new user joining the communication session or an active speaker reaching a threshold for speech activity.

6. The computer-implemented method of claim 1, further comprising: determining that the role corresponds to the at least one prerequisite of the user by identifying at least one of a keyword match between the role and the at least one prerequisite, a phrase match between the role and the at least one prerequisite, or a character using match between the role and the at least one prerequisite by applying historical data to a heuristic-based operation.

7. The computer-implemented method of claim 1, wherein one or more permissions restrict movement of the rendering of the video stream of the at least one select user within the designated region of a user interface in response to the detected changes of activities, wherein the detected changes of activities includes at least one of a detection of shared content provided by at least one participant of the communication session, or modifications of renderings of other participants of the communication session based on a new user joining the communication session or an active speaker reaching a threshold for speech activity, wherein renderings of a second set of users displayed in a second designated region are configured to be modified in response to the state change.

8. A computing device for providing persistent participant prioritization across communication sessions, comprising:

one or more processing units; and a computer-readable storage medium having encoded thereon computer-executable instructions to cause the one or more processing units to:

automatically access settings of a user of a communication session, wherein the settings persist across multiple communication sessions, and define individual prerequisites for the user based on the settings of the user, determining that at least one prerequisite of the user maps to a required role of another user;

analyzing a data structure that relates individual users in the communication session, the data structure specifies one or more roles of the individual users in the communication session;

based on the analysis of the data structure, identifying at least one select user of the communication session having the role that corresponds to the at least one prerequisite of the user, wherein the at least one select user is different from the user; and during the communication session:

causing a display of video streams of the communication session on a user interface rendered on a device associated with the user and on respective devices associated with other users of the communication session;

in response to the at least one prerequisite in the settings of the user, causing a persistent display of a rendering of a video stream of the at least one select user within a designated region on the device associated with the user having the at least one prerequisite that corresponds to the role of the at least one select user, the persistent display of the video stream of the at least one select user is not provided to other users in the communication that do not have the prerequisite that corresponds to the role of the at least one select user; and in response to detected changes of activities in the communication session:

modifying the video streams of the communication session rendered on the device associated with the user and on the respective devices associated with other users of the communication session, to reflect the changes of activities in the communication session; and maintaining the rendering of the persistent video stream of the at least one select user on the device of the user by maintaining a location or a size of the persistent display despite of the video streams of the communication session being modified to reflect the changes of activities in the communication session, wherein the rendering of the video stream of the at least one select user on the respective devices associated with other users is moved or resized depending on the changes of activities in the communication session.

9. The computing device of claim 8, wherein the system accesses the settings in response to the user joining the communication session for enabling the system to automatically display the at least one select user in the user interface without requiring an input from the user, permissions for the settings are configured to allow the system to access settings prior to the user joining the session to enable the system to display the at least one select user in the designated region when the user joins the communication session.

10. The computing device of claim 8, wherein one or more permissions restrict movement of the rendering of the video stream of the at least one select user within the designated region of a user interface in response to the detected changes of activities, wherein the detected changes of activities includes at least one of a detection of a data rate of at least one computing device of the communication session below a data rate threshold.

11. The computing device of claim 8, wherein one or more permissions restrict movement of the rendering of the video stream of the at least one select user within the designated region of a user interface in response to the detected changes of activities, wherein the detected changes of activities includes at least one of a detection of shared content provided by at least one participant of the communication session for display on a primary region of one or more computing devices participating in the communication session.

12. The computing device of claim 8, wherein one or more permissions restrict movement of the rendering of the video stream of the at least one select user within the designated region of a user interface in response to in response to a predetermined state change of the communication session, wherein the state change includes at least one of a detection of shared content provided by at least one participant of the communication session, or modifications of renderings of other participants of the communication session based on a new user joining the communication session or an active speaker reaching a threshold for speech activity.

13. The computing device of claim 8, wherein one or more permissions restrict movement of the rendering of the video stream of the at least one select user within the designated region of a user interface in response to a predetermined state change of the communication session, wherein the state change includes at least one of a detection of shared content provided by at least one participant of the communication session, or modifications of renderings of other participants of the communication session based on a new user joining the communication session or an active speaker reaching a threshold for speech activity, wherein renderings of a second set of users displayed in a second designated region are configured to be modified in response to the state change.

14. A computer-readable storage medium having encoded thereon computer-executable instructions to cause one or more processing units of a system to:

automatically access settings of a user of a communication session, wherein the settings persist across multiple communication sessions, and define individual prerequisites for the user based on the settings of the user, determining that at least one prerequisite of the user maps to a required role of another user;

analyzing a data structure that relates individual users in the communication session, the data structure specifies one or more roles of the individual users in the communication session;

based on the analysis of the data structure, identifying at least one select user of the communication session having the role that corresponds to the at least one prerequisite of the user, wherein the at least one select user is different from the user; and during the communication session:

causing a display of video streams of the communication session on a user interface rendered on a device associated with the user and on respective devices associated with other users of the communication session;

in response to the at least one prerequisite in the settings of the user, causing a persistent display of a rendering of a video stream of the at least one select user within a designated region on the device associated with the user having the at least one prerequisite that corresponds to the role of the at least one select user, the persistent display of the video stream of the at least one select user is not provided to other users in the communication that do not have the prerequisite that corresponds to the role of the at least one select user; and in response to detected changes of activities in the communication session:

modifying the video streams of the communication session rendered on the device associated with the user and on the respective devices associated with other users of the communication session, to reflect the changes of activities in the communication session; and maintaining the rendering of the persistent video stream of the at least one select user on the device of the user by maintaining a location or a size of the persistent display despite of the video streams of the communication session being modified to reflect the changes of activities in the communication session, wherein the rendering of the video stream of the at least one select user on the respective devices associated with other users is moved or resized depending on the changes of activities in the communication session.

15. The computer-readable storage medium of claim 14, wherein the system accesses the settings in response to the user joining the communication session for enabling the system to automatically display the at least one select user in the user interface without requiring an input from the user, permissions for the settings are configured to allow the system to access settings prior to the user joining the session to enable the system to display the at least one select user in the designated region when the user joins the communication session.

16. The computer-readable storage medium of claim 14, wherein one or more permissions restrict movement of the rendering of the video stream of the at least one select user within the designated region of a user interface in response to the detected changes of activities, wherein the detected changes of activities includes at least one of a detection of a data rate of at least one computing device of the communication session below a data rate threshold.

17. The computer-readable storage medium of claim 14, wherein one or more permissions restrict movement of the rendering of the video stream of the at least one select user within the designated region of a user interface in response to the detected changes of activities, wherein the detected changes of activities includes at least one of a detection of shared content provided by at least one participant of the communication session for display on a primary region of one or more computing devices participating in the communication session.

18. The computer-readable storage medium of claim 14, wherein one or more permissions restrict movement of the rendering of the video stream of the at least one select user within the designated region of a user interface in response to the detected changes of activities, wherein the detected changes of activities includes at least one of a detection of shared content provided by at least one participant of the communication session, or modifications of renderings of other participants of the communication session based on a new user joining the communication session or an active speaker reaching a threshold for speech activity.

19. The computer-readable storage medium of claim 14, wherein the instructions further cause the one or more processing units to: determining that the role corresponds to the at least one prerequisite of the user by identifying at least one of a keyword match between the role and the at least one prerequisite, a phrase match between the role and the at least one prerequisite, or a character using match between the role and the at least one prerequisite by applying historical data to a heuristic-based operation.

20. The method of claim 1, wherein the changes of activities in the communication session includes detection of at least one of a volume of a speaker exceeding a volume threshold, a number of spoken words exceeding a threshold number of words.

* * * * *